United States Patent
Trisnadi et al.

(10) Patent No.: US 7,138,620 B2
(45) Date of Patent: Nov. 21, 2006

(54) TWO-DIMENSIONAL MOTION SENSOR

(75) Inventors: Jahja I. Trisnadi, Cupertino, CA (US); Clinton B. Carlisle, Palo Alto, CA (US); Robert J. Lang, Alamo, CA (US)

(73) Assignee: Silicon Light Machines Corporation, San Jose, CA (US)

( * ) Notice: Subject to any disclaimer, the term of this patent is extended or adjusted under 35 U.S.C. 154(b) by 0 days.

(21) Appl. No.: 11/261,316

(22) Filed: Oct. 28, 2005

(65) Prior Publication Data

US 2006/0091301 A1    May 4, 2006

Related U.S. Application Data

(60) Provisional application No. 60/623,320, filed on Oct. 29, 2004.

(51) Int. Cl.
 *G09G 5/00* (2006.01)
(52) U.S. Cl. .................. 250/221; 345/156; 345/166
(58) Field of Classification Search ............. 250/221, 250/222.1; 345/156, 163, 166, 175
 See application file for complete search history.

(56) References Cited

U.S. PATENT DOCUMENTS

| | | | |
|---|---|---|---|
| 3,922,093 A | 11/1975 | Dandliker et al. |
| 4,546,347 A | 10/1985 | Kirsch |
| 4,799,055 A | 1/1989 | Nestler et al. |
| 5,288,993 A | 2/1994 | Bidiville et al. |
| 5,473,344 A | 12/1995 | Bacon et al. |
| 5,578,813 A | 11/1996 | Allen et al. |
| 5,644,139 A | 7/1997 | Allen et al. |
| 5,703,356 A | 12/1997 | Bidiville et al. |
| 5,729,008 A | 3/1998 | Blalock et al. |
| 5,729,009 A | 3/1998 | Dandliker et al. |
| 5,786,804 A | 7/1998 | Gordon |
| 5,825,044 A | 10/1998 | Allen et al. |
| 5,854,482 A | 12/1998 | Bidiville et al. |
| 5,907,152 A | 5/1999 | Dandliker et al. |
| 5,963,197 A | 10/1999 | Bacon et al. |
| 5,994,710 A | 11/1999 | Knee et al. |
| 6,031,218 A | 2/2000 | Piot et al. |
| 6,037,643 A | 3/2000 | Knee |
| 6,057,540 A | 5/2000 | Gordon et al. |
| 6,097,371 A | 8/2000 | Siddiqui et al. |
| 6,151,015 A | 11/2000 | Badyal et al. |
| 6,172,354 B1 | 1/2001 | Adan et al. |
| 6,225,617 B1 | 5/2001 | Dandliker et al. |
| 6,233,368 B1 | 5/2001 | Badyal et al. |
| 6,281,881 B1 | 8/2001 | Siddiqui et al. |
| 6,281,882 B1 | 8/2001 | Gordon et al. |
| 6,326,950 B1 | 12/2001 | Liu |
| 6,330,057 B1 | 12/2001 | Lederer et al. |
| 6,351,257 B1 | 2/2002 | Liu |
| 6,396,479 B1 | 5/2002 | Gordon |
| 6,421,045 B1 | 7/2002 | Venkat et al. |
| 6,424,407 B1 | 7/2002 | Kinrot et al. |

(Continued)

*Primary Examiner*—Kevin Pyo
(74) *Attorney, Agent, or Firm*—William E. Nuttle

(57) ABSTRACT

An optical sensor and method of using the same is provided for sensing relative movement between the sensor and a surface by detecting changes in optical features of light reflected from the surface. In one embodiment, the sensor includes a two dimensional array of photosensitive elements, the array including at least a first plurality of photosensitive elements arranged and coupled to sense a first combined movement along a first set of at least two non-parallel axes, and a second plurality of photosensitive elements arranged and coupled to sense a second combined movement along a second set of at least two non-parallel axes.

15 Claims, 12 Drawing Sheets

U.S. PATENT DOCUMENTS

| | | |
|---|---|---|
| 6,433,780 B1 | 8/2002 | Gordon et al. |
| 6,452,683 B1 | 9/2002 | Kinrot et al. |
| 6,455,840 B1 | 9/2002 | Oliver et al. |
| 6,462,330 B1 | 10/2002 | Venkat et al. |
| 6,476,970 B1 | 11/2002 | Smith |
| 6,529,184 B1 | 3/2003 | Julienne |
| 6,585,158 B1 | 7/2003 | Norskog |
| 6,603,111 B1 | 8/2003 | Dietz et al. |
| 6,621,483 B1 | 9/2003 | Wallace et al. |
| 6,657,184 B1 | 12/2003 | Anderson et al. |
| 6,664,948 B1 | 12/2003 | Crane et al. |
| 6,674,475 B1 | 1/2004 | Anderson |
| 6,677,929 B1 | 1/2004 | Gordon et al. |
| 6,703,599 B1 | 3/2004 | Casebolt et al. |
| 6,737,636 B1 | 5/2004 | Dietz et al. |
| 6,774,351 B1 | 8/2004 | Black |
| 6,774,915 B1 | 8/2004 | Rensberger |
| 6,795,056 B1 | 9/2004 | Norskog et al. |
| 6,809,723 B1 | 10/2004 | Davis |
| 6,819,314 B1 | 11/2004 | Black |
| 6,823,077 B1 | 11/2004 | Dietz et al. |
| 2006/0106319 A1* | 5/2006 | Todoroff et al. ............ 600/476 |

* cited by examiner $\cos(K_x x)\cos(K_y y)$

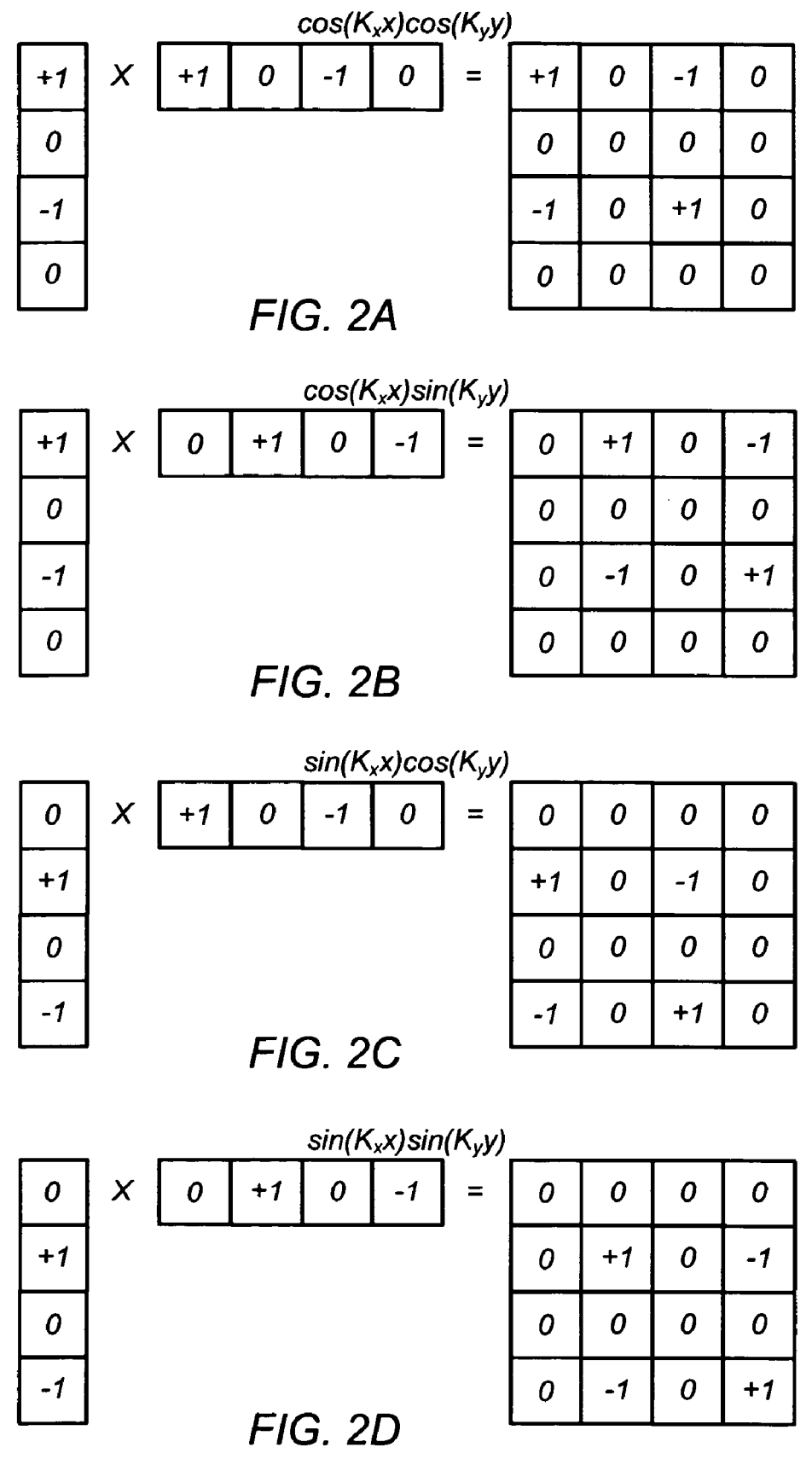

| +1 |   | +1 | 0  | -1 | 0  |   | +1 | 0 | -1 | 0 |
|----|---|----|----|----|----|---|----|---|----|---|
| 0  | × |    |    |    |    | = | 0  | 0 | 0  | 0 |
| -1 |   |    |    |    |    |   | -1 | 0 | +1 | 0 |
| 0  |   |    |    |    |    |   | 0  | 0 | 0  | 0 |

FIG. 2A $\cos(K_x x)\sin(K_y y)$

| +1 |   | 0 | +1 | 0 | -1 |   | 0 | +1 | 0 | -1 |
|----|---|---|----|---|----|---|---|----|---|----|
| 0  | × |   |    |   |    | = | 0 | 0  | 0 | 0  |
| -1 |   |   |    |   |    |   | 0 | -1 | 0 | +1 |
| 0  |   |   |    |   |    |   | 0 | 0  | 0 | 0  |

FIG. 2B $\sin(K_x x)\cos(K_y y)$

| 0  |   | +1 | 0 | -1 | 0 |   | 0  | 0 | 0  | 0 |
|----|---|----|---|----|---|---|----|---|----|---|
| +1 | × |    |   |    |   | = | +1 | 0 | -1 | 0 |
| 0  |   |    |   |    |   |   | 0  | 0 | 0  | 0 |
| -1 |   |    |   |    |   |   | -1 | 0 | +1 | 0 |

FIG. 2C $\sin(K_x x)\sin(K_y y)$

| 0  |   | 0 | +1 | 0 | -1 |   | 0 | 0  | 0 | 0  |
|----|---|---|----|---|----|---|---|----|---|----|
| +1 | × |   |    |   |    | = | 0 | +1 | 0 | -1 |
| 0  |   |   |    |   |    |   | 0 | 0  | 0 | 0  |
| -1 |   |   |    |   |    |   | 0 | -1 | 0 | +1 |

FIG. 2D

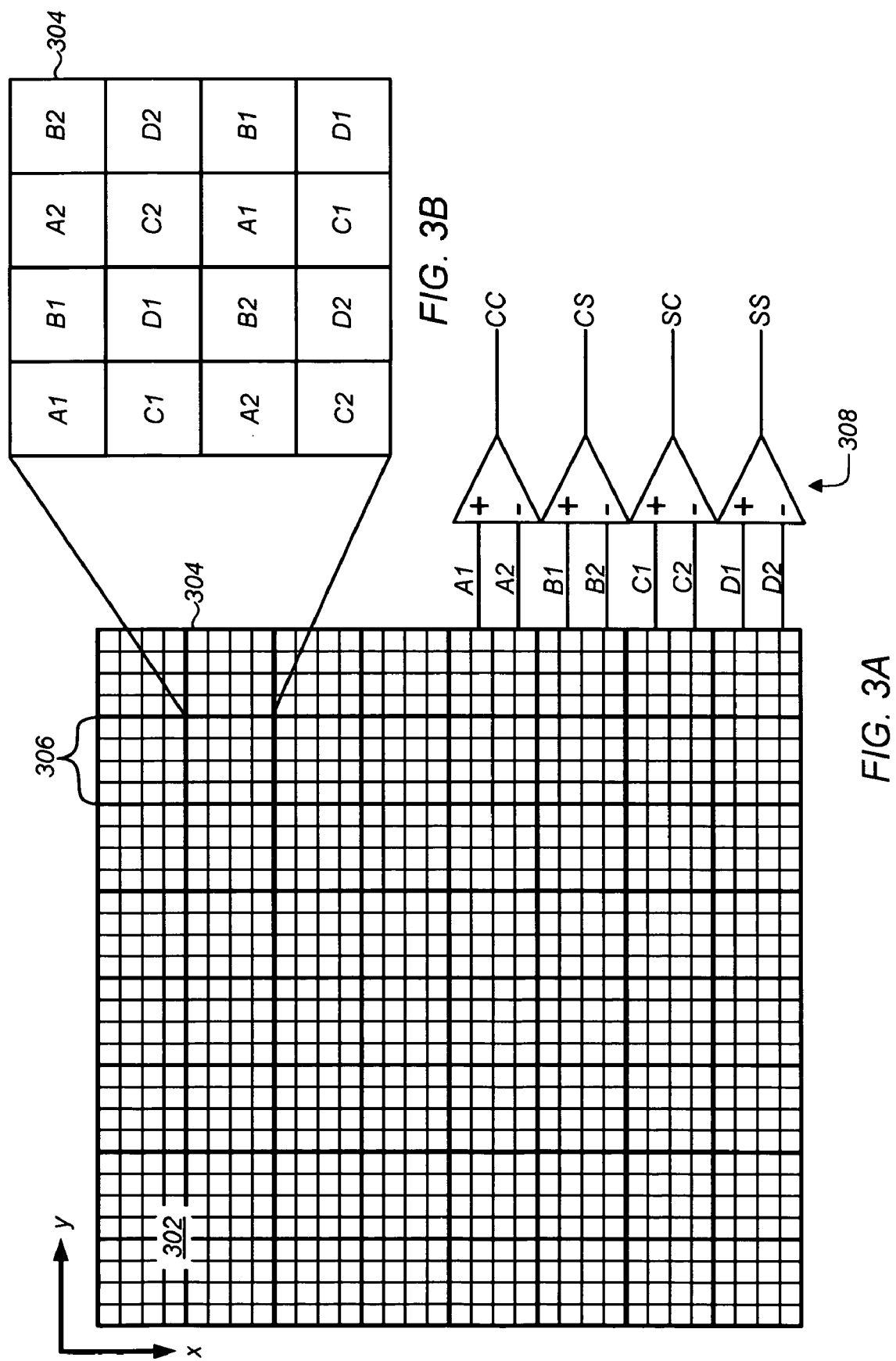

TWO-DIMENSIONAL MOTION SENSOR

CROSS-REFERENCE TO RELATED APPLICATIONS

The present application claims the benefit of priority under 35 U.S.C. 119(e) to U.S. Provisional Patent Application Ser. No. 60/623,320, filed Oct. 29, 2004, entitled Two-Dimensional Comb-Detector Array For Displacement Measurement; which application is hereby incorporated by reference.

TECHNICAL FIELD

The present invention relates generally to optical navigation systems and methods of sensing movement using the same.

BACKGROUND OF THE INVENTION

Data input devices, such as computer mice, touch screens, trackballs and the like, are well known for inputting data into and interfacing with personal computers and workstations. Such devices allow rapid relocation of a cursor on a monitor, and are useful in many text, database and graphical programs. A user controls the cursor, for example, by moving the mouse over a surface to move the cursor in a direction and over distance proportional to the movement of the mouse.

Computer mice come in both optical and mechanical versions. Mechanical mice typically use a rotating ball to detect motion, and a pair of shaft encoders in contact with the ball to produce a digital signal used by the computer to move the cursor. One problem with mechanical mice is that they are prone to inaccuracy and malfunction after sustained use due to dirt accumulation, etc. In addition, the movement and resultant wear of the mechanical elements, particularly the shaft encoders, necessarily limit the useful life of the device.

One solution to the above-discussed problems with mechanical mice has been the development of mice using an optical navigation system. These optical mice have become very popular because they provide a better pointing accuracy and are less susceptible to malfunction due to accumulation of dirt.

The dominant technology used today for optical mice relies on a light sources, such as a light emitting diode (LED), illuminating a surface at or near grazing incidence, a two-dimensional (2D) CMOS (complimentary metal-oxide-semiconductor) detector which captures the resultant images, and signal processing unit that correlates thousands of features or points in successive images to determine the direction, distance and speed the mouse has been moved. This technology provides high accuracy but suffers from a complex design and relatively high image processing requirements.

As an improvement, the use of a coherent light source, such as a laser, to illuminate a rough surface creates a complex interference pattern, called speckle, which has several advantages, including efficient laser-based light generation and high contrast images even under illumination at normal incidence. Laser-based light generation has a high electrical-to-light conversion efficiency, and a high directionality that enables a small, efficient illumination footprint tailored to match a footprint of the array of photodiodes. Moreover, speckle patterns allow tracking operation on virtually any rough surfaces (broad surface coverage), while maintaining the maximum contrast even under unfavorable imaging condition, such as being "out-of-focus".

An alternative approach for measuring linear displacements uses an optical sensor having one-dimensional (1D) arrays of photosensitive elements, such as photodiodes, commonly referred to as a comb-array. The photodiodes within a 1D array may be directly wired in groups to enable analog, parallel processing of the received signals, thereby reducing the signal processing required and facilitating motion detection. For two-dimensional (2D) displacement measurements using this approach, multi-axes linear arrays have been proposed in which two or more 1D arrays are arranged along non-parallel axes.

Although a significant simplification over prior correlation-type optical mice, these 1D comb-array devices have not been wholly satisfactory for a number of reasons. In particular, one drawback of these speckle-based devices is their limited accuracy along directions that deviate significantly from the 1D array orientations. This is especially a problem where the optical mouse is moved in an off-axis direction causing the speckle pattern or image to enter and leave the field of view of the 1D array too quickly before the image has a chance to build-up an unambiguous signal. This deficiency can be partially remedied by increasing the number of axes, but at the price of reducing the simplicity of the linear comb-array approach.

Accordingly, there is a need for an optical pointing device and method of using the same that combines the 2D displacement measurement accuracy of a correlator-type device with the signal processing simplicity of a comb-array type device.

The present invention provides a solution to these and other problems, and offers further advantages over conventional devices and methods of using the same.

BRIEF DESCRIPTION OF THE DRAWINGS

These and various other features and advantages of the present invention can be understood more fully from the detailed description that follows and from the accompanying drawings, which however, should not be taken to limit the appended claims to the specific embodiments shown, but are for explanation and understanding only, where:

FIGS. 2A–2D are matrices showing cosine and sine assignments for a two-dimensional (2D) comb-array according to an embodiment of the present invention;

FIGS. 3A and 3B are schematic block diagrams of a 2D comb-array constructed from the matrices of FIGS. 2A–2D and having photosensitive elements grouped in a 4×4 elements-per-cell configuration according to an embodiment of the present invention;

DETAILED DESCRIPTION

Figure 1:
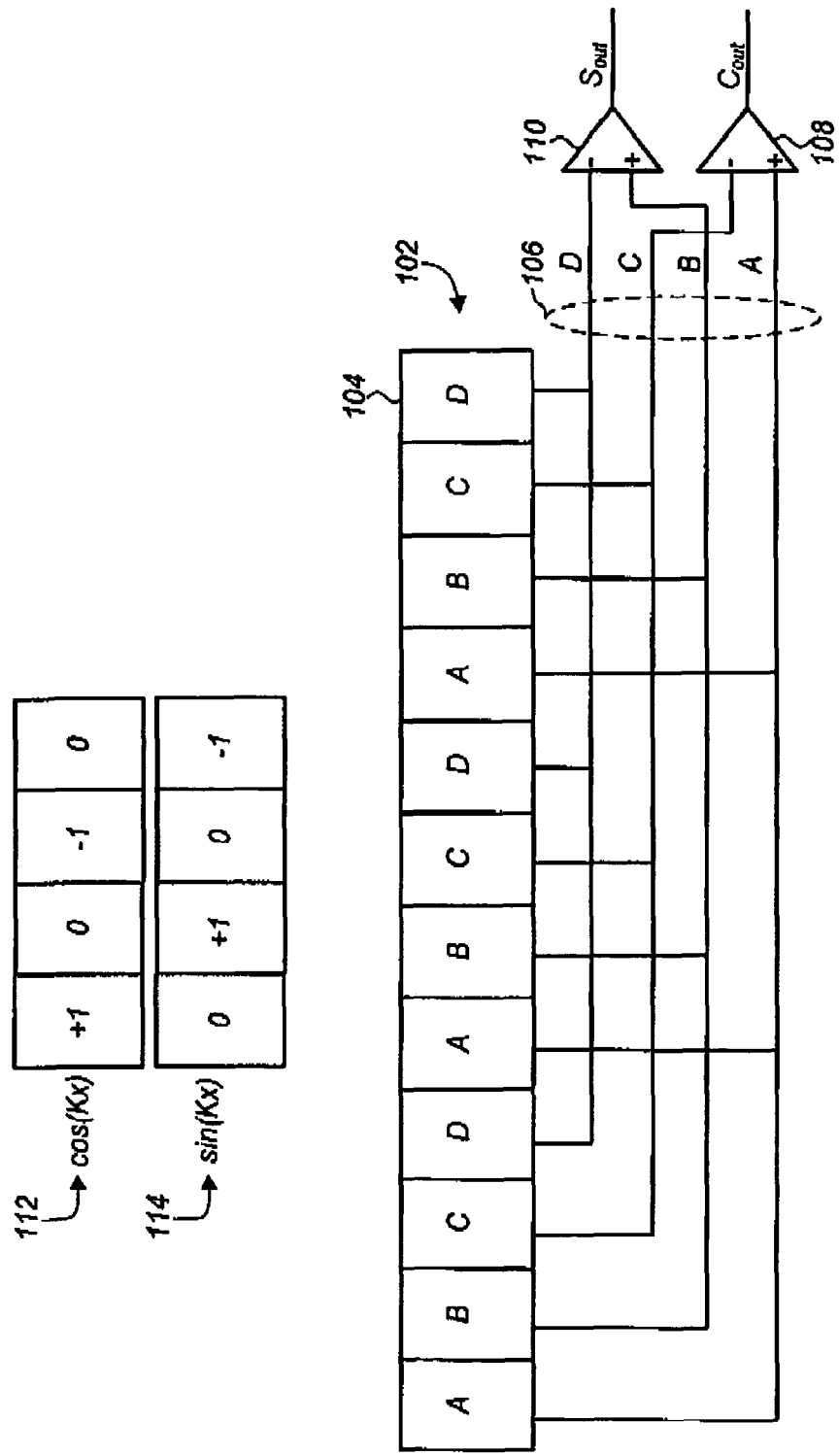
FIG. 1 (prior art) is a schematic block diagram of a linear, one-dimensional (1D) comb-array in a four (4) photosensitive elements per period configuration and the associated cosine and sine templates.

The present invention relates generally to optical navigation systems, and more particularly to optical sensors for sensing relative lateral movement between the sensor and a surface on or over which it is moved. Optical navigation systems can include, for example, an optical computer mouse, trackballs and the like, and are well known for inputting data into and interfacing with personal computers and workstations.

In the following description, for purposes of explanation, numerous specific details are set forth in order to provide a thorough understanding of the present invention. It will be evident, however, to one skilled in the art that the present invention may be practiced without these specific details. In other instances, well-known structures, and techniques are not shown in detail or are shown in block diagram form in order to avoid unnecessarily obscuring an understanding of this description.

Reference in the description to "one embodiment" or "an embodiment" means that a particular feature, structure, or characteristic described in connection with the embodiment is included in at least one embodiment of the invention. The appearances of the phrase "one embodiment" in various places in the specification do not necessarily all refer to the same embodiment. The term "to couple" as used herein may include both to directly connect and to indirectly connect through one or more intervening components.

Preferably, the optical sensor of the present invention is a speckle-based sensor, which senses movement based on displacement of a complex intensity distribution pattern of light, known as speckle. Speckle is essentially the complex interference pattern generated by scattering of coherent light off of a rough surface and detected by an intensity photo-sensitive element, such as a photodiode, with a finite angular field-of-view (or numerical aperture). More preferably, the optical sensor includes a two-dimensional (2D) array that combines the displacement measurement accuracy of a 2D correlator with the signal processing simplicity and efficiency of a linear or one-dimensional (1D) comb-array. The 2D array may be either a periodic, 2D comb-array, which includes a number of regularly spaced photosensitive elements having 1D or 2D periodicity, a quasi-periodic 2D array (such as a Penrose tiling), or a non-periodic 2D array, which has a regular pattern but doesn't include periodicities. By a 2D comb-array it is meant a planar array of a number of regularly spaced and electrically connected photosensitive elements extending substantially in at least two non-parallel directions, and having periodicity in two dimensions.

The following description develops the theory for a 2D comb-array signal processing and describes various exemplary embodiments of 2D comb-array architectures.

Image-correlation vs. Comb-array Processing

It is instructive to compare the signal processing for image correlation to a comb-array technique in one-dimension (1D).

1D Correlation

The correlation between two signals f and g can be expressed as:

$$corr(f, g)_m = \sum_{n=0}^{N-1} f_n g^*_{n-m}. \qquad (1)$$

It is assumed that both f and g have zero means. Otherwise the signals can always be redefined by offsetting with their respective means.

If g has some resemblance to f, the correlation peaks at the particular value of shift m for which the common features of both signals are generally best aligned, or "correlated." For a "1D" mouse, it is sufficient to consider the case where g is, to a large degree, a displaced version of f i.e. $g_n = f_{n+x}$. The correlation becomes:

$$corr(f, f_{+x})_m = \sum_{n=0}^{N-1} f_n f^*_{n+x-m} \qquad (2)$$

where x is the displacement.

The peaks of the correlation function (Eq. 2) occurs at m=x. Therefore knowledge of the peak position determines the displacement.

In the conventional optical mouse, a captured signal f is used as a short-term template to be correlated with a subsequent capture. Once the displacement is determined, the new capture replaces the old template and so on. This dynamic template is desirable for arbitrary signals. If the class of signals is predetermined, such as a periodic signal, a fixed template can be employed, thereby removing the necessity of continuously updating the signal templates. This greatly simplifies the correlation operation as well as the device implementation. Indeed a comb-array is such a device as described in greater detail below.

To this end the signals can be represented as discrete Fourier transform (DFT) expansions as follows:

$$f_n = \sum_{a=0}^{N-1} F_a e^{2\pi i a n/N}, \quad g_n = \sum_{a=0}^{N-1} G_a e^{2\pi i a n/N} \qquad (3)$$

Thus, correlation (1) becomes:

$$corr(f, g)_m = \sum_{n=0}^{N-1}\left(\sum_{a=0}^{N-1} F_a e^{2\pi i a n/N}\right)\left(\sum_{b=0}^{N-1} G_b^* e^{-2\pi i b(n-m)/N}\right) \quad (4)$$

$$= \sum_{a=0}^{N-1}\sum_{b=0}^{N-1} F_a G_b^* e^{2\pi i b m/N} \sum_{n=0}^{N-1} e^{2\pi i (a-b)n/N}$$

$$= \sum_{a=0}^{N-1}\sum_{b=0}^{N-1} F_a G_b^* e^{2\pi i b m/N} \delta_{ab}$$

$$= \sum_{a=0}^{N-1} F_a G_a^* e^{2\pi i a m/N}$$

and correlation (2) becomes:

$$corr(f, f_{+x})_m = \sum_{a=0}^{N-1} F_a F_a^* e^{2\pi i a(m-x)/N} \quad (5)$$

1D Comb-array

A linear or 1D comb-array is an array having multiple photosensitive elements that are connected in a periodic manner, so that the array acts as a fixed template that interrogates one spatial frequency component of the signal. An embodiment of one such 1D comb-array is shown in FIG. 1 and described in greater detail below. The connection of multiple photosensitive elements in a periodic manner enables the comb-array to serve effectively as a correlator at one spatial frequency K (defined by a pitch of the photosensitive elements in the array and the collection optics). The comb signal, now viewed as a function of the displacement x, is:

$$V_x = F_A F_A^* e^{2\pi i A(m-x)/N} = C e^{iK(m-x)} \quad (6)$$

where C is a slowly varying amplitude and K≡2πA/N the selected spatial frequency. The factor $e^{iKm}$ can be thought as the phase that encodes the initial alignment of the selected spatial frequency component and the template.

Thus, it can be concluded that a 1D comb-array is essentially a 1D correlation at one spatial frequency.

Two-dimensional Comb-array

The above observation leads to the conclusion that a 2D comb-array can be constructed and configured to provide a 2D correlation at one spatial frequency $\vec{K}=(K_x, K_y)$.

The 2D correlation of an image f and a displaced version of itself [(x, y) is the displacement] is:

$$corr(f, f_{+x,+y})_{m,n} = \sum_{a=0}^{N-1}\sum_{b=0}^{N-1} F_{a,b} F_{a,b}^* e^{2\pi i a(m-x)/N} e^{2\pi i b(n-y)/N} \quad (7)$$

In analogy to equation 6 above, the 2D comb-array signal is:

$$V_{x,y} = C e^{iK_x(m-x)} e^{iK_y(n-y)} \quad (8)$$

As above, $(K_x, K_y) \equiv (2\pi A/N, 2\pi B/N)$ is the selected 2D spatial frequency. The comb signal is simply the product of harmonic functions of the x and y displacements. Notice that the comb-array signal is periodic and peaks whenever the template is spatially in-phase with the image spatial frequency.

Setting m, n=0 for simplicity, the exponential products in equation 8 can be expanded into four trigonometric products:

$$CC = \cos(K_x x)\cos(K_y y)$$

$$CS = \cos(K_x x)\sin(K_y y)$$

$$SC = \sin(K_x x)\cos(K_y y)$$

$$SS = \sin(K_x x)\sin(K_y y) \quad (9)$$

The next step is to determine the 2D array configuration that generates the four signals shown in (9) above.

It is instructive to first review the generation of the in-phase and the quadrature signals in a 1D comb-array configuration with 4 elements per period. FIG. 1 shows a general configuration (along one axis) of a 1D comb-array 102 of photosensitive elements, such as photodiodes 104, wherein the combination of interlaced groups of photosensitive elements serves as a periodic filter on spatial frequencies of light-dark signals produced by the speckle (or non-speckle) images. In the embodiment shown, the 1D comb-array 102 consists of a number of photodiode sets or periods, each having four of photodiodes 104, labeled here as A, B, C, and D. Currents or signals from corresponding or similarly labeled photodiodes 104 in each period are electrically connected (wired sum) to form four line signals 106 coming out from the array 102. Background suppression and signal accentuation is accomplished by using differential analog circuitry 108 to generate an in-phase differential current signal, labeled here as $C_{out}$, and differential analog circuitry 110 to generate a quadrature differential current signal, labeled here as $S_{out}$. Comparing the phase of the in-phase and quadrature signals permits determination of the magnitude and direction of motion of the 1D comb-array 102 relative to a scattering surface.

Referring to FIG. 1, the in-phase $C_{out}$ and the quadrature $S_{out}$ signals are obtained by taking the underlying speckle pattern and processing them according to the cosine and sine templates, 112 and 114 respectively. Preferably, the system is designed so that an optical "light-dark" signal pattern, i.e., speckle, has a size substantially equal to the period of the comb-array—four (4) photodiodes 104 or pixels in the embodiment of FIG. 1. The in-phase signal current is obtained from $C_{out}$=A−C, and the quadrature signal current from $S_{out}$=B−D as shown in FIG. 1.

The above cosine and sine assignments can now be applied to the 2D case. The result is four matrices shown in FIGS. 2A–2D for the four harmonic products shown in equations 9 above. In particular, FIG. 2A shows the matrix of the CC or cos ($K_x$x) cos ($K_y$ y) signal for a 2D comb-array having photosensitive elements grouped in a 4×4 elements-per-cell configuration. To simplify the notation, the subscript "out" is dropped from here on. Similarly, FIG. 2B shows the matrix for the CS signal, FIG. 2C shows the matrix for the SC signal, and FIG. 2D shows the matrix for the SS signal.

A 2D comb-array can now be constructed from the above matrices, as shown in FIGS. 3A and 3B. Here, the 2D comb-array 302 has multiple photosensitive elements 304 arranged or grouped into cells 306, each cell having photosensitive elements grouped in a 4×4 elements-per-cell (or 4×4 elements/period) configuration. Photosensitive elements 304 within a cell 306 with the same letter and same number, as shown in the detail of FIG. 3B, as well as corresponding elements of all cells in the 2D comb-array 302 with the same number, are electrically connected or wired-sum to yield eight signals A1 through D2.

The eight wired-sum signals are further combined with differential amplifiers 308 to give the following four signals:

$$CC = A1 - A2$$

$$CS = B1 - B2$$

$$SC = C1 - C2$$

$$SS = D1 - D2 \qquad (10)$$

These four signals contain the in-phase and quadrature information in the x and y directions. Using trigonometry identities, the harmonic products can be converted to simple harmonics (of sum and difference):

$$\cos(K_x x + K_y y) = CC - SS$$

$$\sin(K_x x + K_y y) = SC + CS$$

$$\cos(K_x x - K_y y) = CC + SS$$

$$\sin(K_x x - K_y y) = SC - CS \qquad (11)$$

Optionally, the coordinate system or the array can be rotated by 45° to get expression in pure x and y. In either orientation, the 2D displacement can then be determined. In practice, the $K_x$ and $K_y$ can be taken to be equal.

The 2D comb-array offers a simplicity of design and several further advantages over the conventional 2D correlation and/or multi-axis 1D comb-array, including: (i) faster signal processing; (ii) reduced power consumption; (iii) high angular accuracy; and (iv) performance that is independent of a direction movement relative to an array orientation.

The 2D comb-array has significantly faster signal processing than correlation because it generates much less data to process, and consequently much simpler algorithms to execute. For example, zero-crossing detection algorithm can be employed to determine the displacements. To specify a displacement in a plane, two real numbers are needed, namely the x and y translations. In a conventional correlation-based optical mouse, these two real numbers are determined from successive image correlation. Because each image in the correlation-based approach typically comprises about $10^3$ pixels, a large amount of data needs to be processed just to determine the two x- and y-translation values. In contrast, the 2D comb-array produces only four (4) positive real numbers, which are equivalent to just two (2), signed real numbers. In a sense, parallel processing is built into the inter-connection architecture of the 2D comb-array. By "wiring" the processing into the architecture, the remaining external computation becomes relatively simple and can be accomplished quickly. Simple computation translates to smaller signal processing circuitry, while faster processing allows high velocity tracking and increased resources to implement sophisticated digital signal processing (DSP) algorithms that can boost tracking performance of an optical navigation system using the optical sensor of the present invention even further.

The 2D comb-array is expected to consume less electric power than a correlation-based device because it has much less data to process, and consequently much simpler algorithms to implement. This is a highly desirable feature for power-sensitive applications such as a wireless optical mouse. The electric power consumption can be further reduced by combination with efficient laser illumination, such as in laser speckle based mice.

The angular accuracy of a 2D comb-array can be scaled much easier than that of a conventional 2D correlator mouse. The minimum angle that can be detected by a 2D sensor is inversely proportional to the number of photosensitive elements in a row or a column. Improving angular accuracy depends generally on an increase in the number of photosensitive elements of the array. This constitutes a heavy penalty for a 2D correlator mouse, because the quantity of data to be processed goes up quadratically with the number of elements in a row or a column. In contrast, the quantity of data or number of signals to be processed in a 2D comb-array mouse is independent of the number of elements. That is, the number of differential signals output from the 2D comb-array is always equal to four in a 2D comb-array having a configuration similar to that shown in FIGS. 3A and 3B, and therefore the angular accuracy is limited only by the size of the array that can be implemented.

Figure 4A:
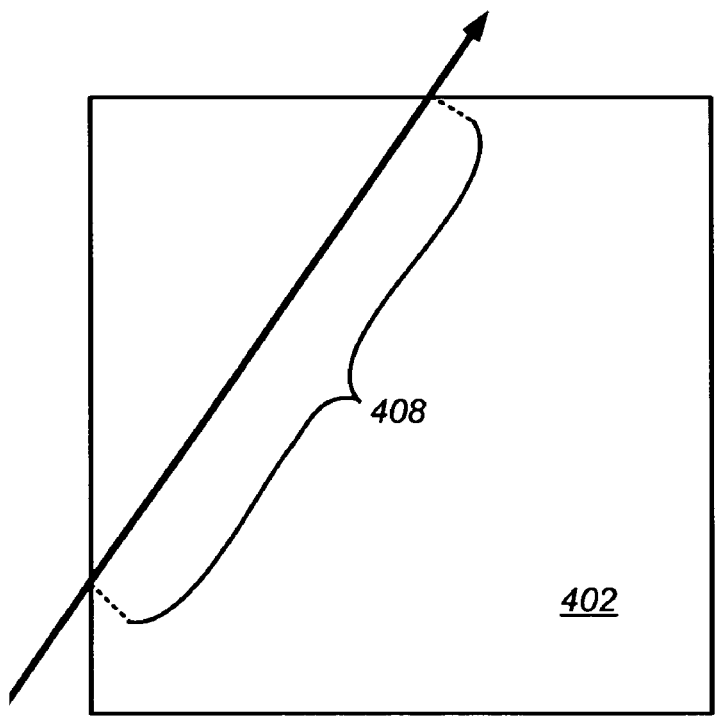
FIGS. 4A and 4B are diagrams comparing two orthogonal (or 1D×1D) linear comb-arrays with a 2D comb-array according to an embodiment of the present invention.
Figure 4B:
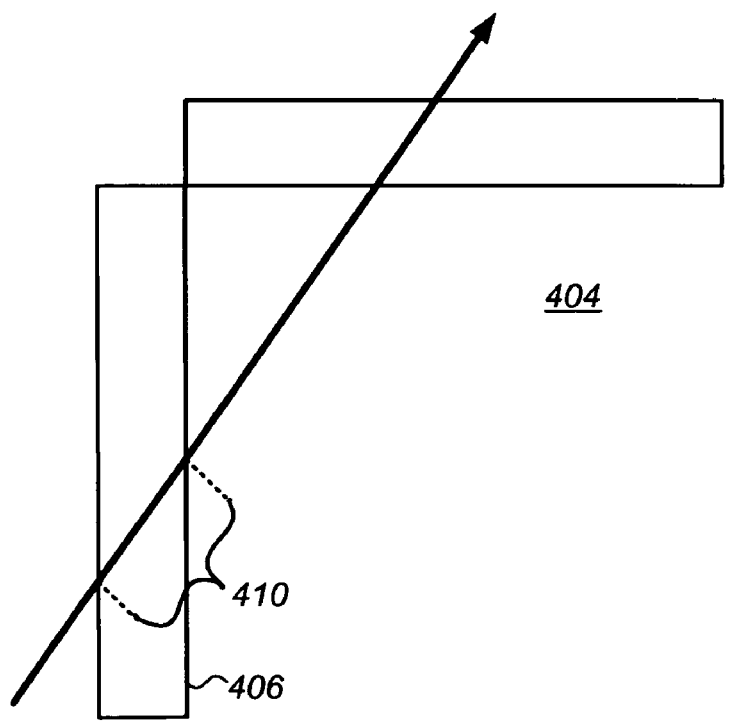

Finally, compare to the 1D comb-array, the performance of the 2D comb-array is independent of the direction movement relative to the array. Referring to FIGS. 4A and 4B, the performance of the 2D comb-array 402 is superior to an optical sensor 404 having multiple linear or 1D comb-arrays 406 since each point in the image, on average, traverses a much longer path 408 inside the active area of the 2D comb-array 402 in all directions than a path 410 in the 1D comb-array 406, and therefore contributes more to the displacement estimation. Moreover, because the embodiments of the 2D comb-array described heretofore operate with symmetric (e.g. square) pixel geometries, matching the "light-dark" signal pattern, i.e., speckle, to the period of the 2D comb-array is more easily achieved, resulting in improved signal contrast and higher front-end SNR than can be achieved with conventional 1D comb arrays that typically employ highly "asymmetric" pixel shapes. Finally, it is much simpler to efficiently illuminate the 2D array, hence less power consumption, than a multi-axis 1D comb-arrays.

Exemplary Embodiment and Experimental Validation

Figure 5:
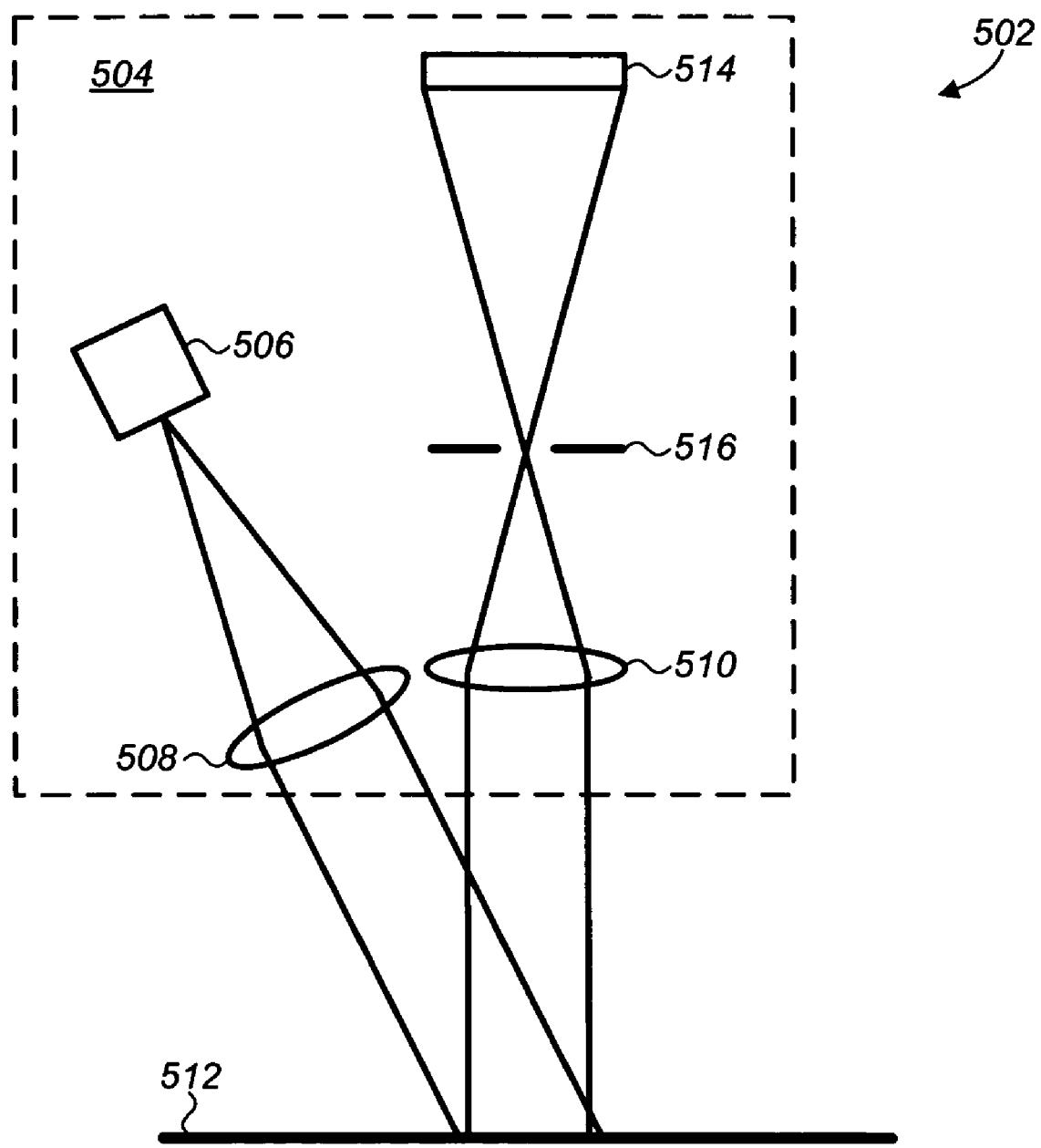
FIG. 5 is a schematic block diagram of an optical navigation system having a speckle-based 2D comb-array according to an embodiment of the present invention.

An exemplary embodiment of an optical navigation system having a speckle-based 2D comb-array according to an embodiment of the present invention is shown in FIG. 5. Referring to FIG. 5, the optical navigation system 502 generally includes an optical head 504 having a light source 506, such as a VCSEL (Vertical Cavity Surface Emitting Laser), illumination optics including a first or collimating lens 508 to collimate a diverging light beam, imaging optics including a second or imaging lens 510 to map or image an illuminated portion of a rough, scattering surface 512 to a 2D comb-array 514 at the image plane of the second lens. Preferably, the illumination optics are configured to illuminate the surface 512 at a predetermined incident angle selected to permit lift detection, by which the device ceases to track the motion if the separation of the of the optical head 504 or data input device from the surface 512 exceeds a predetermined separation. The imaging optics may include an aperture 516 at the back focal plane of the second lens 510 to provide a telecentric imaging system that preserves good speckle pattern integrity during motion and to match an average size of the speckle to a period of the 2D comb-array.

Figure 6A:
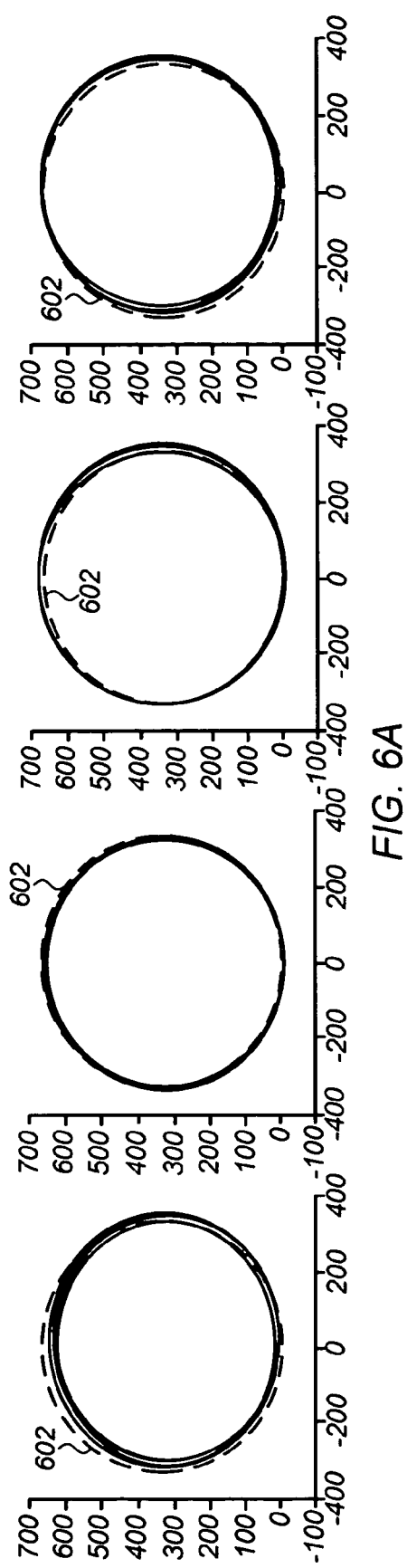
FIGS. 6A and 6B are graphs of circular trajectories at various speeds and over various surfaces for an optical navigation system with a 2D comb-array according to an embodiment of the present invention versus actual movement of the system.
Figure 6B:
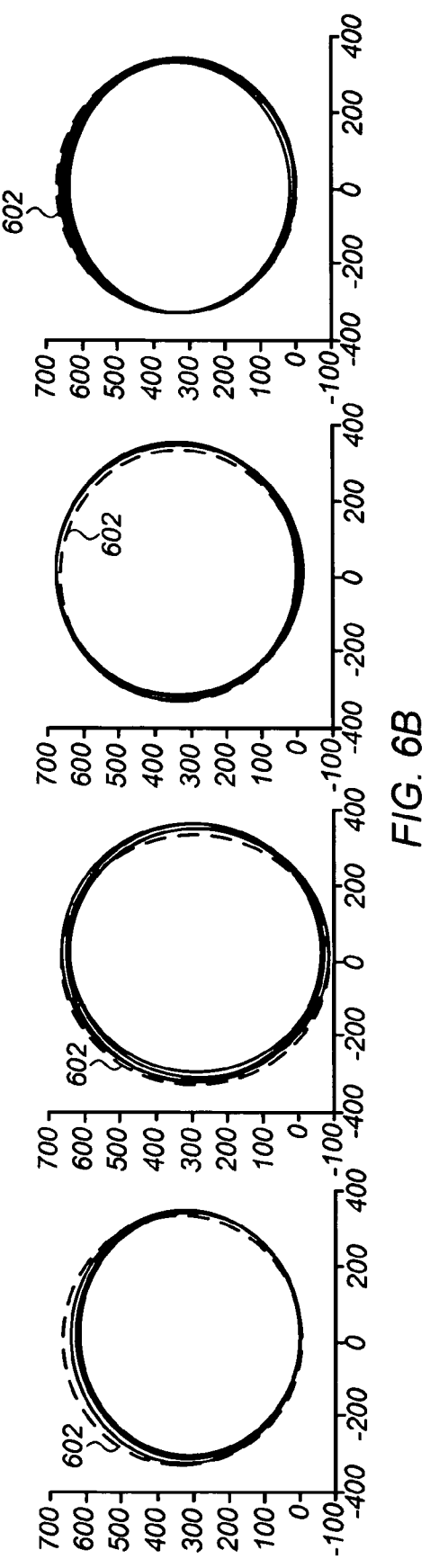

For the purpose of validating advantages of an optical navigation system 502 having a 2D comb-array 514 of the present invention, a square, symmetrical 2D comb-array similar to that shown in FIGS. 3A and 3B, was fabricated having 32×32 photodiodes (PD) or elements. The results for circular trajectories at various speeds and over two different surfaces, validating the disclosed approach are shown in FIGS. 6A and 6B. The experiments from which the graphs of FIGS. 6A and 6B were derived were carried out on a test platform, where the relative motion between an optical head of the optical navigation system and the surface is controlled with very high precision. The graphs of FIG. 6A illustrate the circular trajectories produced when the optical head was moved four times in a circle having a radius of 1 cm over a white surface at speeds of 1 cm/s, 10 cm/s, 25 cm/s and 40 cm/s. FIG. 6B illustrate the circular trajectories produced when the optical head was moved over a wood grain surface at these same speeds. In FIGS. of 6A and 6B, the dashed reference circles are indicated by the reference number 602, and the traces or circular trajectories produced by the optical navigation system indicated by solid black lines. The numbers along the axes are in arbitrary units. As can be seen from these traces, an optical navigation system with a sensor using a 2D comb-array of the present invention is capable of sensing movement over patterned and un-patterned surfaces at speeds of up to 40 cm/s and with path errors of typically less than 5%. Subsequent testing has demonstrated accurate tracking performance for a wide variety of surfaces and a broad range of motions.

Array Generalizations

Numerous generalizations for linear or 1D comb-arrays have been described, for example, in co-pending, commonly assigned U.S. patent application Ser. Nos. 11/129,967, 11/123,525, and 11/123,326, which are incorporated herein by reference in its entirety. Many of these generalizations are similarly applicable to the 2D comb-array of the present invention including: (i) 2D comb-arrays having other than 4×4 elements-per-cell; (ii) 2D comb-arrays having multiple sub-arrays of a given spatial frequency; (iii) 2D comb-arrays having multiple sub-arrays of different spatial frequencies; and (iv) 2D comb-arrays with dynamically reconfigurable comb connections between the photosensitive elements to enable the spatial frequency to be dynamically changed, for example, to optimize strength of signals from the array. It will further be appreciated that a 2D comb-array in accordance with the present invention may also include a combination of the above generalizations or embodiments.

Figure 7:
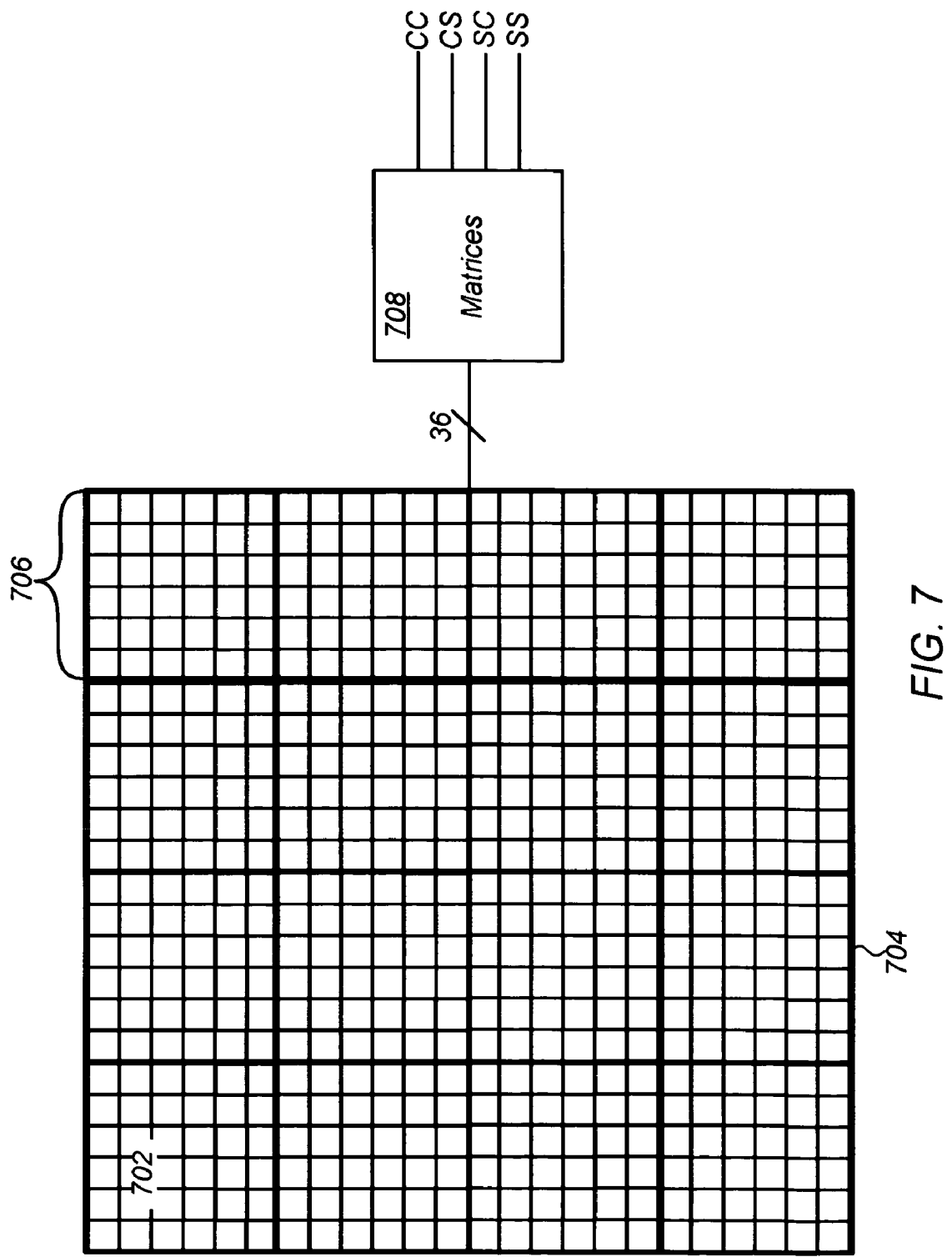
FIG. 7 is a schematic block diagram of a 2D comb-array having photosensitive elements grouped in a 6×6 elements-per-cell configuration according to an embodiment of the present invention.
Figure 8:
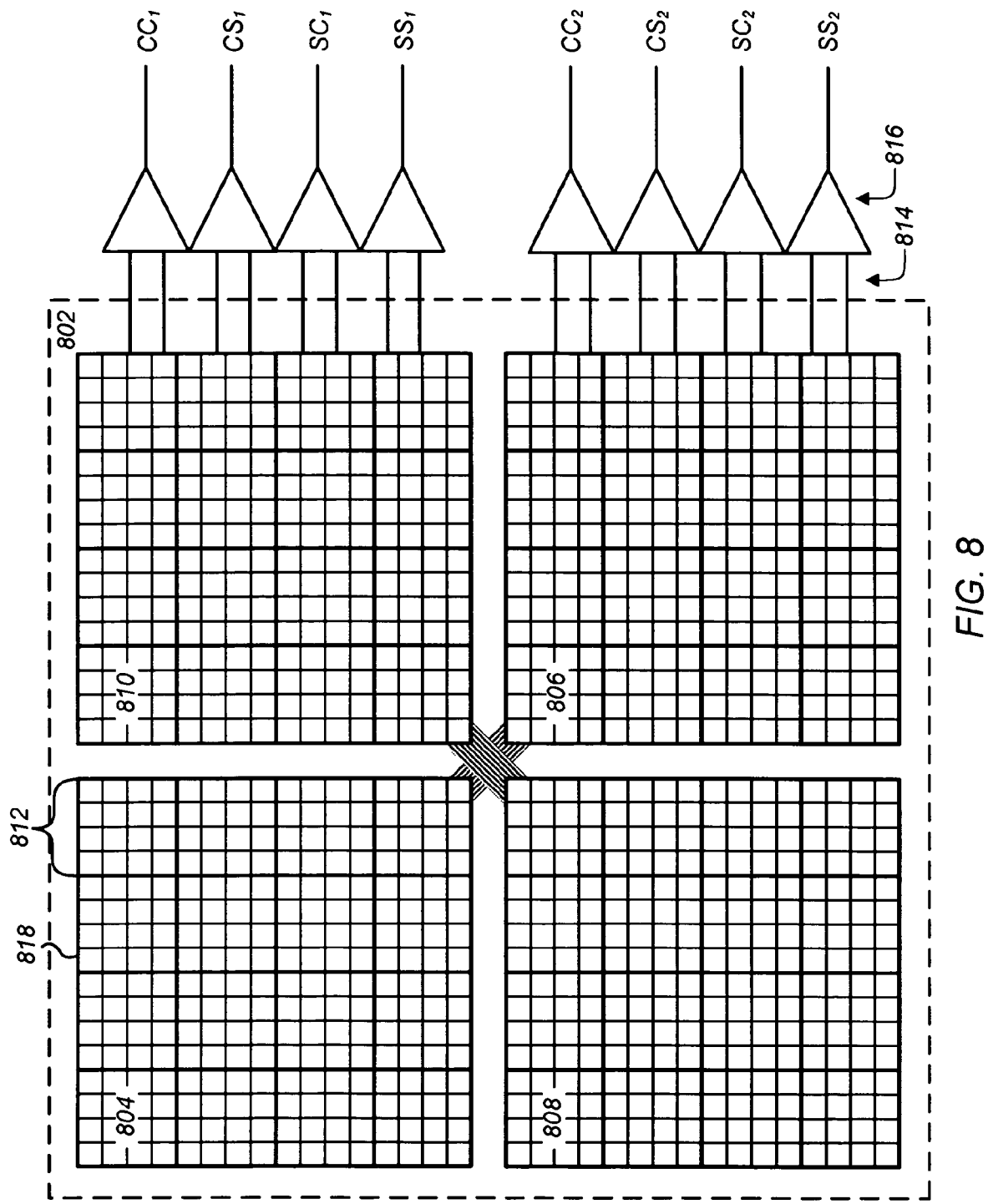
FIG. 8 is a schematic block diagram of an optical sensor having two 2D comb-arrays arranged in quadrants according to an embodiment of the present invention.

Certain alternative embodiments of a 2D comb-array including one or more of the above generalizations will now be described in greater detail with reference to FIGS. 7 and 8.

One alternative embodiment of 2D comb-array has other than 4×4 elements-per-cell. For example, as shown in FIG. 7 the 2D comb-array 702 includes a number of photosensitive elements, such as photodiodes 704, grouped or arranged in cells 706 with a 6×6 elements-per-cell (or 6×6 elements/period) configuration. As in the example described above with reference to FIGS. 3A and 3B, certain elements 704 within each cell 706, and corresponding elements of all cells in the 2D comb-array 702 are coupled to one of thirty-six (36) output lines. The 36 wired-sum signals are further combined with weight factors in accordance with the matrices 708 to produce four output signals—CC, CS, SC and SS. Details of the matrices 708 used to produce each of these four signals are shown in detail in the tables below.

| CC | | | | | |
|---|---|---|---|---|---|
| 1 | 0.5 | −0.5 | −1 | −0.5 | 0.5 |
| 0.5 | 0.25 | −0.25 | −0.5 | −0.25 | 0.25 |
| −0.5 | −0.25 | 0.25 | 0.5 | 0.25 | −0.25 |

-continued

| CC | | | | | |
|---|---|---|---|---|---|
| −1 | −0.5 | 0.5 | 1 | 0.5 | −0.5 |
| −0.5 | −0.25 | 0.25 | 0.5 | 0.25 | −0.25 |
| 0.5 | 0.25 | −0.25 | −0.5 | −0.25 | 0.25 |

| CS | | | | | |
|---|---|---|---|---|---|
| 0 | 0.866 | 0.866 | 0 | −0.87 | −0.87 |
| 0 | 0.433 | 0.433 | 0 | −0.43 | −0.43 |
| 0 | −0.43 | −0.43 | 0 | 0.433 | 0.433 |
| 0 | −0.87 | −0.87 | 0 | 0.866 | 0.866 |
| 0 | −0.43 | −0.43 | 0 | 0.433 | 0.433 |
| 0 | 0.433 | 0.433 | 0 | −0.43 | −0.43 |

| SC | | | | | |
|---|---|---|---|---|---|
| 0 | 0 | 0 | 0 | 0 | 0 |
| 0.866 | 0.433 | −0.43 | −0.87 | −0.43 | 0.433 |
| 0.866 | 0.433 | −0.43 | −0.87 | −0.43 | 0.433 |
| 0 | 0 | 0 | 0 | 0 | 0 |
| −0.87 | −0.43 | 0.433 | 0.866 | 0.433 | −0.43 |
| −0.87 | −0.43 | 0.433 | 0.866 | 0.433 | −0.43 |

| SS | | | | | |
|---|---|---|---|---|---|
| 0 | 0 | 0 | 0 | 0 | 0 |
| 0 | 0.75 | 0.75 | 0 | −0.75 | −0.75 |
| 0 | 0.75 | 0.75 | 0 | −0.75 | −0.75 |
| 0 | 0 | 0 | 0 | 0 | 0 |
| 0 | −0.75 | −0.75 | 0 | 0.75 | 0.75 |
| 0 | −0.75 | −0.75 | 0 | 0.75 | 0.75 |

In other alternative embodiments, the optical sensor can include multiple 2D comb-array or sub-arrays of a given spatial frequency or different spatial frequencies. For example, FIG. 8 shows a schematic block diagram of an optical sensor 802 having two 2D comb-array-pairs arranged in quadrants 804, 806, 808 and 810 according to an embodiment of the present invention. Diagonally opposing quadrants 804 and 806 are connected and form a first single array-pair or first 2D comb-array. Opposing quadrants 808 and 810 are connected and form a second single array-pair or second 2D comb-array.

As in the examples described above, elements within each cell 812 in a quadrant 804, 806, 808 and 810 as well as corresponding elements of all cells in the array-pair are coupled to form sixteen (16) wired-sum signals 814. The 16 wired-sum signals 814 are further combined with differential amplifiers 816 to produce eight (8) signals, CC1, CS1, SC1, SS1 from the first 2D comb-array, and CC2, CS2, SC2, SS2 from the second 2D comb-array. In operation, the strengths of the signals from either of the 2D comb-arrays or array-pairs may decrease because the selected spatial frequency component is weak at some particular location on the surface, or because contributions from various parts of the array add coherently to zero. However, it will be appreciated that fading in any one array-pair is unlikely to result in fading in the other pair, therefore such a multiple array or sub-array configuration is often desirable to mitigate signal fading. Moreover, the square symmetry arrangement of the optical sensor 802 enables simple and efficient illumination of all photosensitive elements 818 in the optical sensor.

Concept Generalizations

A general theory can now be described that leads to the surprising result that by varying the weighting coefficients of the various photosensitive elements in an optical sensor, any 2D array can be used to extract velocity vectors along any finite set of arbitrary axes. Thus far only comb-arrays that had 1D or 2D periodicity have been considered, but other patterns can be used having no periodicity or grouping into cells. For example, a 2D array can have a sunflower floret pattern, or even a pseudo-randomly positioned number of photosensitive elements, and still extract 1D or 2D motion information.

All of the following examples are particular cases of the general concept, i.e., use of a 1D or 2D array to capture 1-dimensional or 2-dimensional motion. Also described are a few new optical sensor configurations.

There are a couple of basic ideas behind a speckle-based optical navigation system. The first is that the speckle pattern is a superposition of 2D spatial frequencies that contains a range of spatial frequencies determined by the optical properties of the system. Second, 1D motion, that is motion along a selected axis or in a selected direction, is detected by selecting a particular distribution of light that is part of the speckle pattern, and observing how it changes with motion along the selected axis or in the selected direction. Ideally, the distribution is one that doesn't change its shape with motion, other than a multiplicative constant (whose value yields the amount or magnitude of the motion). This means that if the distribution is $\phi(x,y)$ it is desirable to keep a constant shape after some translation in some direction. In particular, it is desirable that the elements in 1D sensor be responsive to a translation in any direction, but extracts only the component of motion along the selected axis or in the selected direction. For example, the optical head of the optical navigation system may be moved over a surface in both an x and a y direction, but extract only the component of motion along the x-axis.

If the translation operator is defined over a distance $d_x$ in the x direction to be $T_x(d_x)$, and the translation operator over a distance $d_y$ in the y direction is defined to be $T_y(d_y)$, then it is desired that the function derived satisfy the equation:

$$T_x(d_x)T_y(d_y)\phi(x,y)=\lambda\phi(x,y) \tag{12}$$

for some constant $\lambda$, i.e., translation leaves $\phi(x,y)$ unchanged except for a multiplicative constant. Preferably, it is possible to extract the motion sought from the constant $\lambda$.

This is a recognizable equation—the light distribution sought, $\phi(x,y)$, is an eigenfunction of the known translation operators $T_x(d_x)$ and $T_y(d_y)$. The eigenfunctions of the translation operators are complex exponentials in the direction of translation and can have any functional form whatsoever in the perpendicular direction. That is, for translation in the x-direction, the eigenfunction is:

$$\phi(x,y)=\exp(2\pi i x f_x)\exp(2\pi i y f_y) \tag{13}$$

and the eigenvalue is:

$$\lambda=\exp(2\pi i d_x f_x)\exp(2\pi i d_y f_y) \tag{14}$$

where $f_x$ is the spatial frequency in the x direction, and $f_y$ is the spatial frequency in the y direction.

Thus, by measuring the light distribution before and after motion, extracting the coefficient of the eigenfunction sought and computing the eigenvalue $\lambda$, the distance that traveled along the x (or y) direction can be extracted from $\lambda$ by simple scaling of the computed eigenvalue. This extraction is accomplished by making use of the fact that eigenfunctions are orthogonal under inner product. So given a distribution that contains an eigenfunction of particular interest, it is possible to find out how much of it is present by taking the inner product with the eigenfunction sought. The translation operator is Hermitian under the inner product:

$$(u, v) \equiv \int\int u(x, y)v^*(x, y)dx\,dy, \tag{15}$$

which means that if a speckle pattern, $S(x,y)$, contains some portion of the eigenfunction sought with coefficient of proportionality c, c can be extracted by taking the inner product with the eigenfunction of interest:

$$c = \int\int S(x, y)\exp(-2\pi i x f_x)\exp(-2\pi i y f_y)dx\,dy. \tag{16}$$

Now, a small complication ensues. These eigenfunctions and eigenvalues are complex quantities, but the speckle pattern $S(x,y)$ is real, and it is only possible to perform real arithmetic with photosensitive elements and weighting coefficients in hardware. So, the real and imaginary parts of the complex coefficient are computed separately. In general:

$$c \equiv c_r + ic_i \tag{17}$$
$$= \int\int S(x, y)\Re[\exp(-2\pi i(xf_x + yf_y + \varphi_0))]dx\,dy +$$
$$i\int\int S(x, y)\Im[\exp(-2\pi i(xf_x + yf_y + \varphi_0))]dx\,dy$$

It will be noted that an arbitrary phase factor, $\phi_0$, has been added in the interest of generality.

Equation 17 is integrated to obtain a value for complex c. After moving the sensor or array, the above integration is repeated to get a new value for complex c, c', which should be equal to c$\lambda$. The eigenvalue, $\lambda$, is obtained by taking the ratio of these two values to find out how far the sensor or array has moved. This is made possible by recalling that:

$$\lambda=\exp(2\pi i(d_x f_x + d_y f_y)) \tag{18}$$

Thus, both x-motion and y-motion are confounded in $\lambda$. If it is desired to extract purely x-motion, then the y-contribution can be made to go away by choosing $f_y=0$, i.e., no variation in the y-direction. Then $\lambda$, or equation 18 reduces to:

$$\lambda=\exp(2\pi i(d_x f_x)) \tag{19}$$

and $d_x$ can be extracted from the computed value of $\lambda$ in a straightforward manner.

So, to detect the x-component of motion for arbitrary motion the eigenfunction, $\phi(x,y)$, is chosen equal to exp$(2\pi i x f_x)$. That is: $\phi(x,y)=\exp(2\pi i x f_x)$.

The main and quadrature signals can be computed from the following equation:

$$c \equiv c_r + ic_i \qquad (21)$$
$$= \int\int S(x, y)R[\exp(-2\pi i(xf_x + \varphi_0))]dxdy +$$
$$i\int\int S(x, y)\Im[\exp(-2\pi i(xf_x + \varphi_0))]dxdy$$

The eigenvalue $\lambda$ is then computed from two successive measurements, as described above with reference to equations 17, 18 and 19, and the distance moved in the x-direction extracted from the following equation:

$$\lambda = \exp(2\pi i(d_x f_x)) \qquad (22).$$

It will be appreciated that the above approach can be generalized to detect the component of 1D motion along any desired direction, not just along x (or y). This is most readily accomplished by performing a coordinate rotation so that an axis or direction x runs along the desired direction, and then all the formulas above apply in the rotated coordinate system.

Methods to perform the above integrations in real hardware will now be described. To make the best use of available light photons striking the sensor or array, it is desirable to have a uniformly illuminated array with a fill factor close to unity. That is the array will include a number of photosensitive elements, each at some position $(x_i, y_i)$ within the array, and having a total photosensitive element area $A_i$ trying to cover an array area $B_i$, so the ratio $A_i/B_i$ is the fill factor of the array. In determining motion of the array, eventually the outputs of the photosensitive element are summed, possibly with some weighting coefficients. In order to exactly calculate the coefficients, $c_r$ is used for purposes of illustration, it is desirable to have:

$$c_r = \sum_i \int\int_{B_i} S(x, y)R[\exp(-2\pi i(xf_x + \varphi_0))]dxdy. \qquad (23)$$

However, it is not possible to implement the above equation exactly in hardware. Instead each photosensitive element is given a weighting coefficient $w_{r,i}$, so that the above becomes the weight-plus-sum as follows:

$$c_r = \sum_i w_{r,i} \int\int_{A_i} S(x, y)dxdy. \qquad (24)$$

The closest it is possible to come to equation (23) is:

$$c_r = \sum_i \frac{B_i}{A_i} \int\int_{A_i} S(x, y)R[\exp(-2\pi i(x_i f_x + \varphi_0))]dxdy, \qquad (25)$$

which gives the weighting coefficient the value:

$$w_{r,i} = \frac{B_i}{A_i}R[\exp(-2\pi i(x_i f_x + \varphi_0))] = \frac{B_i}{A_i}\cos(-2\pi(x_i f_x + \varphi_0)) \qquad (26)$$

Similarly, for the imaginary (quadrature) signal:

$$c_i = \sum_i w_{i,i} \int\int_{A_i} S(x, y)dxdy \qquad (27)$$

with:

$$w_{i,i} = \frac{B_i}{A_i}\Im[\exp(-2\pi i(x_i f_x + \varphi_0))] = \frac{B_i}{A_i}\sin(-2\pi(x_i f_x + \varphi_0)). \qquad (28)$$

It should be noted that "i" means two different things in this expression: the first subscript means it's for the imaginary part of c; the second is the index of the photosensitive element.

The above framework can now be used to detect a 1D component of motion along any direction using any 2D array at any spatial frequency. Note that nowhere in the above has a particular 2D array or a 2D array having a particular shape been assumed. However, there are several 2D arrays that have some desirable properties, which will be now be described in greater detail below.

Strategies for Arrays

There are a couple of different strategies or approaches that can be taken in placement of the arrays. First, it should be reiterated that it is helpful to perform at least three 1D detections. It is desirable to have at least two 1D detections to obtain both components of motion, but since speckle is complex, any given eigenfunction could fade out, causing the loss of a signal. It should be noted that no amount of filtering, e.g., Kalman filtering, can provide the correct motion if the user changes direction while the signal has faded. Thus, it is desirable to provide at least one more signal to give some level of resistance to fading. More, would be better of course, although the signal processing required for handling the extra information is more complicated, offsetting some of the advantages realized by using a speckle-based optical sensor having a 2D array. There is some flexibility in how to provide this redundancy including: (i) several spatially separated arrays (spatial redundancy); (ii) different spatial frequencies for a given direction (spatial frequency redundancy); and (iii) multiple axes using more than 2 different directions (directional redundancy)—in which case, of course, the computed motion values are no longer necessarily orthogonal.

For simplicity, in the following description any single motion component detected will be called a "signal/quadrature pair" (SQ-pair). If 2 or more SQ-pairs are to be detected an initial decision must be made as to how to the photosensitive elements in the array are used. In particular, the elements in the array can be connected so that: (i) any given photosensitive element feeds only one SQ-pair; (ii) the signal from every photosensitive element split and given different weighting coefficients, so that any given photosensitive element feeds every SQ-pair; or (iii) some combination of both (i) and (ii). Which approach is used involves in part a tradeoff between power budget and IC or chip size, since signal splitters and buffers consume both, while not using the information from every photosensitive element in every SQ-pair can reduce signal-to-noise ratio (SNR).

An ideal photosensitive element configuration for detecting pure, 1D motion will be considered first. The optimum configuration of the 2D array is having a photosensitive element everywhere with the weighting coefficient as follows:

$$w_{r,i} = \frac{B_i}{A_i} \cos(-2\pi(x_i f_x + \varphi_0)) \tag{29}$$

$$w_{i,i} = \frac{B_i}{A_i} \sin(-2\pi(x_i f_x + \varphi_0)) \tag{30}$$

Since the weighting coefficient doesn't depend at all on $y_i$, all photosensitive elements in a vertical column have exactly the same weighting coefficient. Alternatively, having a number of identical weighting coefficients can be avoided by just wiring together all photosensitive elements in vertical columns—or using tall, skinny photosensitive elements. The implication here is that using a 2D array that is as tall as it is wide will generally give the desired off-axis performance for 1D motion.

It is also noted that the cosine and sine have interleaved zeros. If the weighting coefficient is zero, then there is no need to waste a photosensitive element there, so if the photosensitive elements are spaced ¼ of a period apart, the photosensitive elements for the main and quadrature signals can be interleaved, with each photosensitive element only contributing to a single signal. So one preferred 2D array for 1D motion detection is photosensitive elements arranged in a number of vertical stripes, with alternating signals going to main and quadrature signals. Moreover, the stripes of photosensitive elements also do not need to be made continuous in the vertical direction, because the eigenfunction sought is continuous in the y direction. Thus, it is possible to sample the eigenfunction in y, by interrupting photosensitive elements in the y direction. Instead of making each photosensitive element in a continuous column, every other photosensitive element can be left out, leaving alternating blank rows. These blanks can now be filled in with two more sets of photosensitive elements designed to detect vertical motion. This is basically the symmetrical 2D comb-array having axes in the x and y direction, which has been described above with respect to FIGS. 3A and 3B. However, it should be pointed out that it is possible to construct similarly interleaved 2D arrays having axes in more than 2 directions. For example, FIG. 9 shows a hexagonal array 902, interleaved and wired to produce three (3)1D SQ-pairs along axes 904, 906, and 908, separated by 120°.

Figure 9:
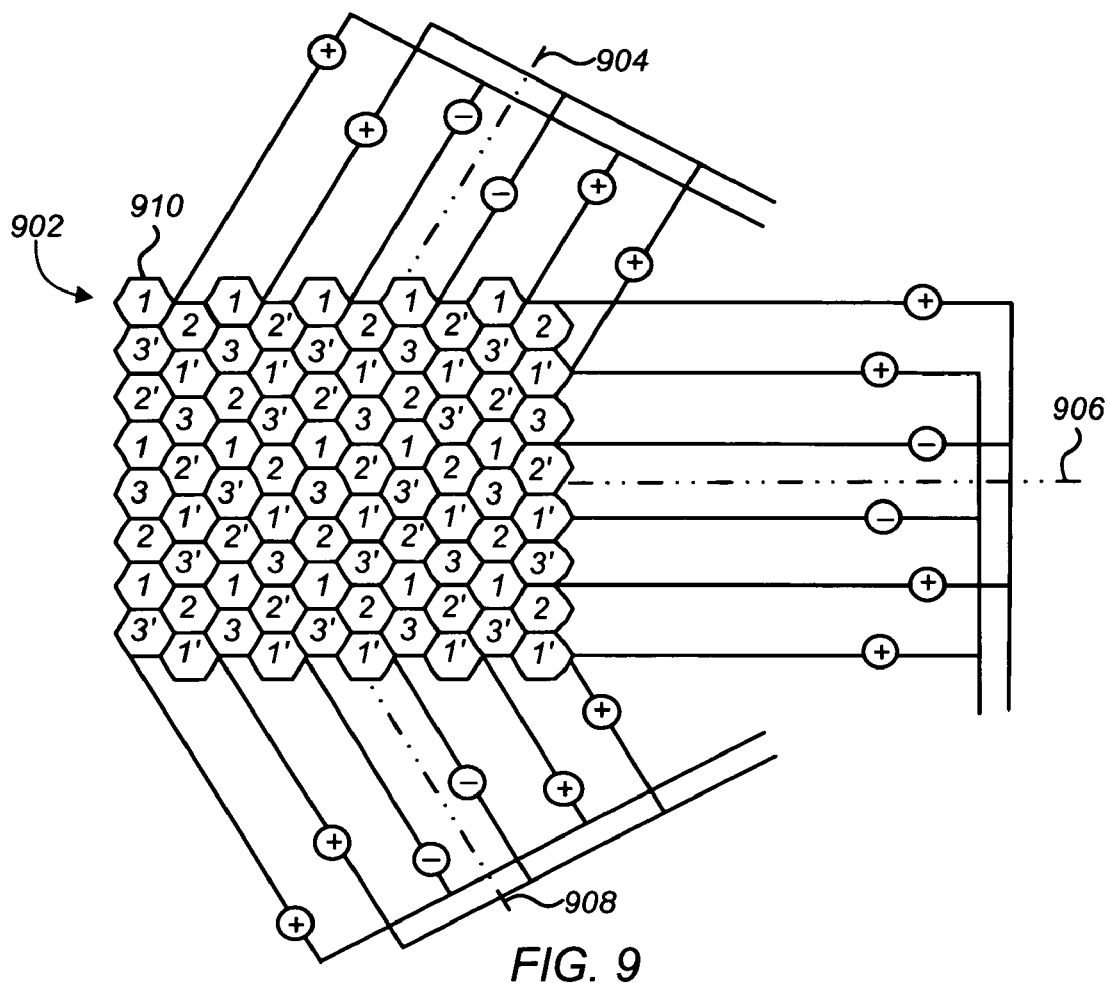
FIG. 9 is a schematic block diagram of an optical sensor having a 2D array of hexagonal photosensitive elements, wired to detect 1D motion along three different axes according to another embodiment of present invention.

Referring to FIG. 9, a grid of hexagonal photosensitive elements 904 is wired to sense 1D motion the along three different axes 904, 906, 908. Photosensitive elements 904 associated with each axis for detecting the in-phase signal are indicated by the same numbers, 1, 2, or 3. Alternating rows of photosensitive elements 904 for detecting the quadrature signal are indicated by like numbers, 1', 2', and 3'. In-phase and quadrature signals from photosensitive elements arranged along each axes 904, 906, 908, are wire-summed, with alternate signs indicating the in-phase (+) and quadrature (−) signals.

One weakness of any interrupted array of photosensitive elements arises from the fact that the signal is sampled, and therefore is susceptible to aliasing. In particular, an interrupted array will pick up any spatial frequencies that are at multiples of the underlying period of the photosensitive elements.

The effect of aliasing can be reduced by using the signal from every photosensitive element, i.e., splitting each element output and sending a copy to every 1D SQ-pair. This increases the sampling rate (since every photosensitive element is used, rather than every $2^{nd}$ or $3^{rd}$ element in a row), and also means using a smoother sampling function (since the sampling function is not a series of delta functions, but rather is convolved with a step function, which suppresses higher harmonics). Nevertheless, some confounding aliased contributions are to be expected if the optical pattern contains strong periodicities, e.g., from a woven cloth or patterned surface.

A way to reduce the susceptibility to aliasing would be to use a completely non-periodic array, and in particular, an array that has no strong peaks at any spatial frequency. One could obtain this by using a pseudo-random distribution of photosensitive elements to blur out periodicities, or by using a regular pattern that doesn't include periodicities. In such an a periodic array, it is generally desirable to use the output from every photosensitive element, since there are no fortuitous zeros that would allow interleaving sets of element at little or no cost.

Figure 10:
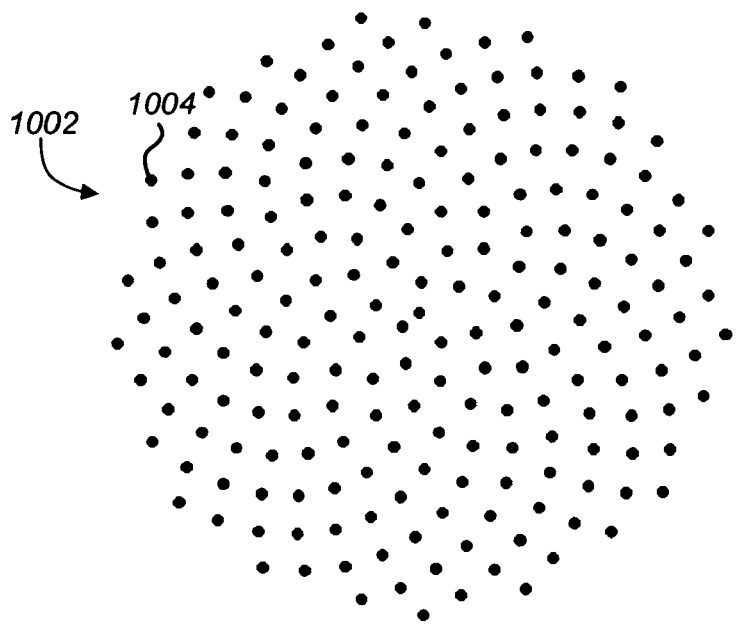
FIG. 10 is a dot pattern for a non-periodic phyllotactic array of photosensitive elements according to yet another embodiment of the present invention.

A particularly interesting a periodic pattern is the so-called phyllotactic array, or "sunflower" array. It has a couple of nice properties: it is based on the Golden Ratio, which is the most irrational of all numbers, meaning it minimizes the height of higher harmonics in its spectrum. It is also fairly easy to generate. In polar coordinates, the jth point is located at $$(\rho_j, \phi_j) = \left(C\sqrt{j}, \frac{2\pi j}{\Phi}\right) \tag{31}$$

where $\Phi$ is the golden ratio, 1.618 . . . An embodiment of a dot pattern for a phyllotactic array 1002 having 200 elements 1004 is shown in FIG. 10.

Figure 11:
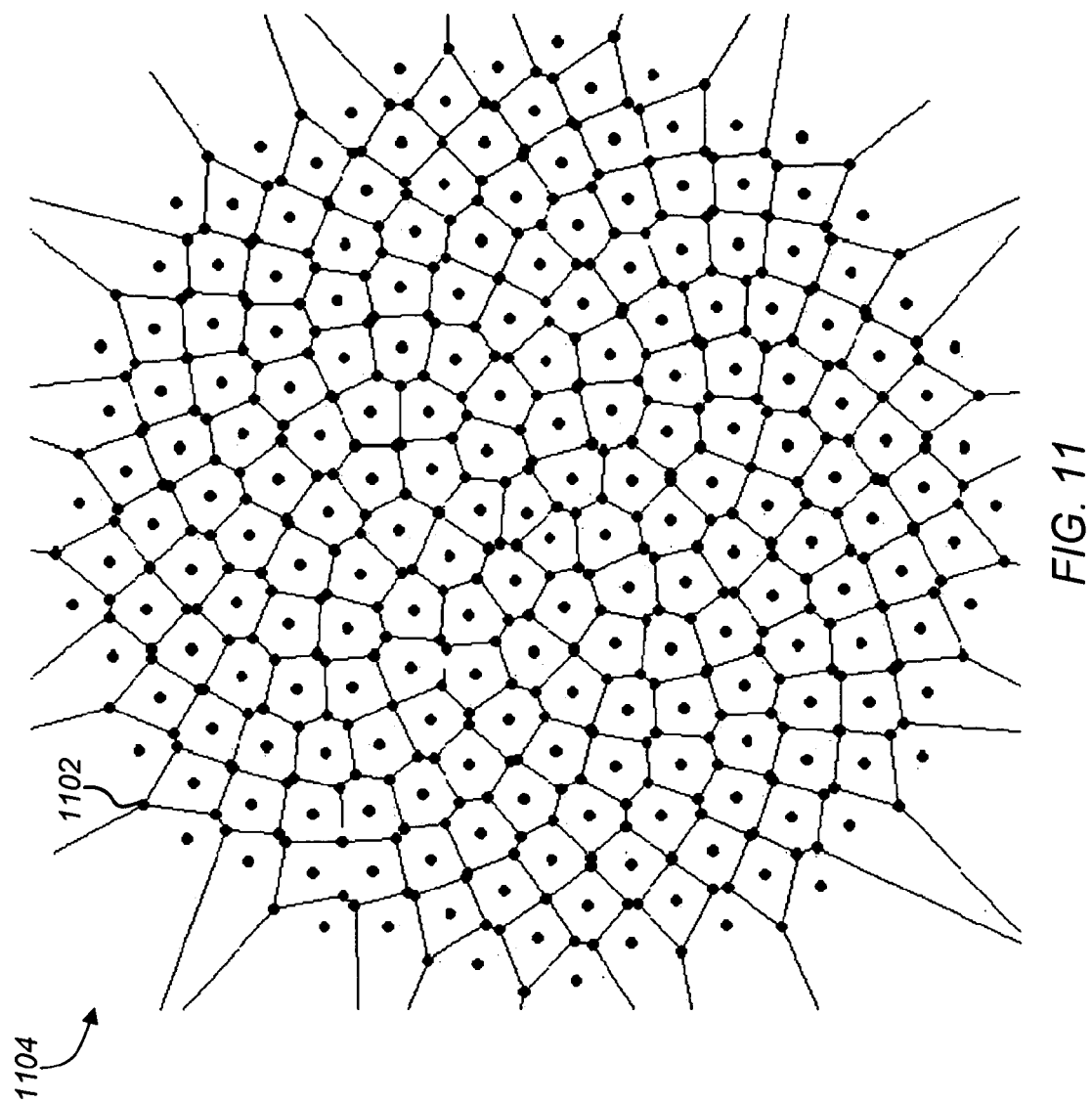
FIG. 11 is a Voronoi diagram showing the photosensitive element pattern for the phyllotactic array of FIG. 10.

With such an array, the optimum photosensitive element size is the Voronoi diagram for the photosensitive element centers (a Wigner-Seitz cell). Thus, the photosensitive element 1102 pattern for the array 1104 would thus look like that shown in FIG. 11.

Such a phyllotactic array 1002 has no strong peaks in its Fourier spectrum, but has roughly average photosensitive element size 1004. It would thus be resistant to aliasing when used on a patterned surface. By using the weighting coefficients computed from the coordinates given above, it should be possible to extract any number of 1D SQ-pairs from this one array.

A possible limitation to a 3-axis 2D array, such as shown in FIG. 9, is that for any one axis, the distribution of photosensitive elements that contribute to each axis of motion is relatively sparse. A desirable feature of the 2D comb-arrays described previously is that by grouping sums of photosensitive elements appropriately, each element can be made to contribute to both axes of motion, without having to put a separate weighting coefficient on each—which is fairly expensive in terms of chip surface area and power consumption. Thus, it is desirable to have a multi-axis 2D array in which each of the photosensitive elements contribute to a motion signal from every axis.

In particular, the concept can be applied to a 3-axis array similar to that described in FIG. 9. In this 3-axis array, each photosensitive element contributes to all three axes of motion, but there are still only a small number of weighting coefficients that are applied only after the output of groups or rows of elements are summed. Accordingly, this embodiment is the 3-axis analog of the 2D comb-array described above.

Figure 12:
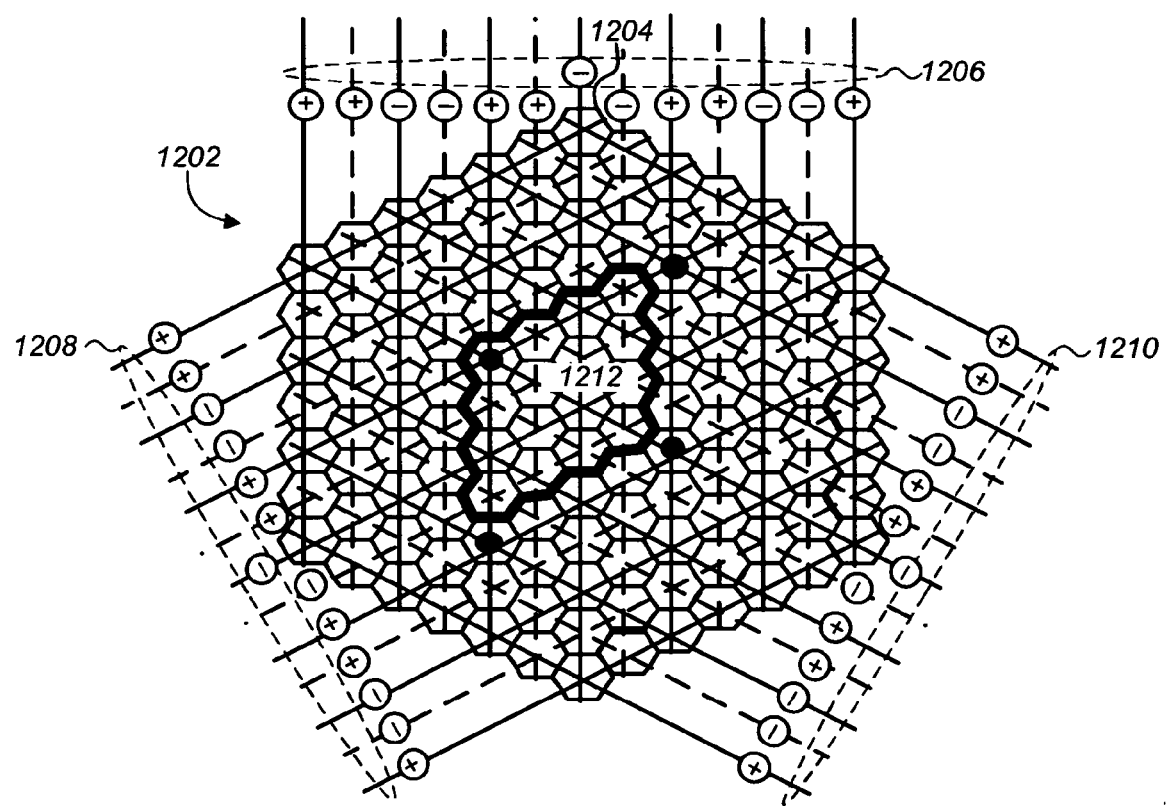
FIG. 12 is a schematic block diagram of an optical sensor having a hexagonal 2D array of hexagonal photosensitive elements according to another embodiment of the present invention.

Referring to FIG. 12, a schematic diagram is shown of a hexagonal array 1202, wired for 3-axis motion detection.

In FIG. 12, each hexagon represents a single photosensitive element 1204, such as a photodiode. Each photosensitive element 1204 in the array 1202 is couple to at least one signal line in each of three groups of signal lines 1206, 1208 and 1210 to detect motion in a direction perpendicular to the signal line. Thus, vertically oriented the signal lines 1206 are for detecting horizontal motion. Note that each of the lines in the groups of signal lines 1206, 1208 and 1210 appear in either a solid or dashed pattern. The solid lines are main or in-phase signal lines for the group, while the dashed lines are for quadrature signal lines. The signs + and − indicate the weighting coefficient of +1 and −1 respectively.

If a photosensitive element 1204 is crossed by a line that means that the element will contribute to a signal that is encoded by the line. In the embodiment shown, every photosensitive element 1204 is crossed by three lines associated with the three different groups of signal lines 1206, 1208 and 1210; that means that each element contributes to a signal for each of the three axes. For example, the photosensitive element 1204 at the very top of the hexagon array 1202 contributes to a main signal of the group of signal lines 1206 with a weighting coefficient −1, to the main signal of the group of signal lines 1208 with a weighting coefficient +1, and to the main signal of the group of signal lines 1210 with a weighting coefficient +1. The photosensitive element just below and to the right contributes to the quadrature signal of the group of signal lines 1206 with a weighting coefficient −1, the quadrature signal of the group of signal lines 1208 with a weighting coefficient +1, and the main signal of the group of signal lines 1210 with a weighting coefficient +1. And so forth.

In principle, with three axes and two types of signal each with two possible weighting coefficients, there would appear to be 64 different possibilities for an element to contribute to each axis. But in fact, there are only 16 possibilities because some combinations do not appear. It can be seen that because the overall pattern is periodic; a heavy black line outlines a unit cell 1212 of the periodic pattern, and there are only 16 elements in the unit cell. So there are basically 16 distinct "flavors" of photosensitive element 1204, each element characterized by the weighting coefficient that applies for each of the three axes and whether it goes to main or quadrature for that axis. (Note that the heavy black dots indicate photosensitive elements of the same flavor or making the same contribution to each axis.) Thus, in the wiring scheme, all photosensitive element 1204 of a given flavor, are wired together giving 16 output signals. The signal from each flavor can be split three ways, the weighting coefficient appropriate to each of the 3 signals applied, and then combine the output signals into main and quadrature signals for each of the three axes.

The above embodiment enables the acquisition of 3-axis information that can be combined to give resistance to fading in any single axis, and enable the use of each photosensitive element 1204 in all three axes, giving better SNR and better resistance to aliasing than arrays in previous speckle-based optical sensors.

It's also possible to apply the above approach to a square array of photosensitive elements and get four axes of information by exploiting the idea of using different spatial frequencies in the array. In particular, four axes can be derived from a square 2D array, similar to that of FIGS. 3A and 3B, essentially by adding more connections to the photosensitive elements. An embodiment of this will be described with reference to FIG. 13.

Figure 13:
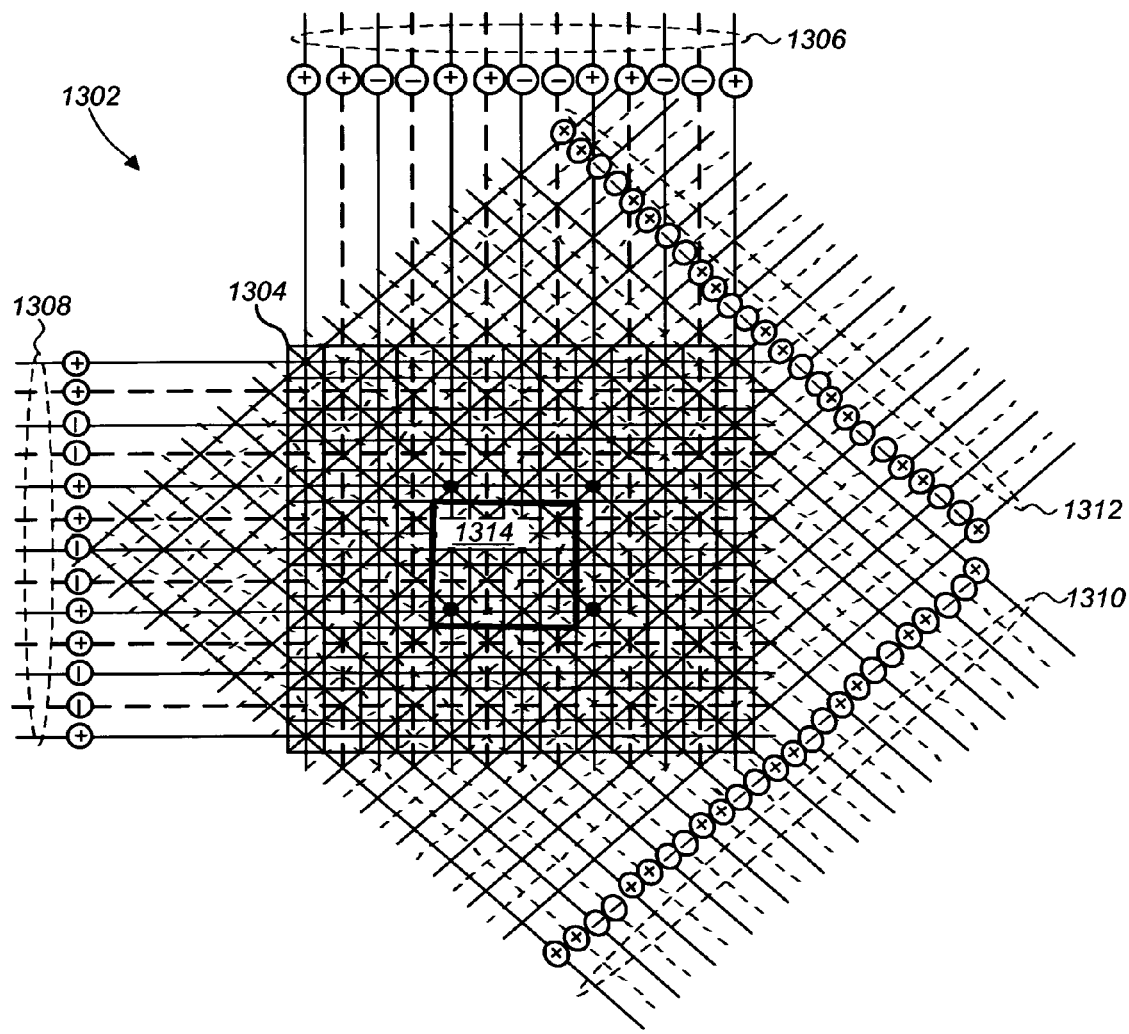
FIG. 13 is a schematic block diagram of an optical sensor having a square 2D array wired for 4-axis motion detection according to an embodiment of the present invention.

FIG. 13 shows a square, 2D array 1302 and wiring diagram for four axes of motion detection. The connection of photosensitive elements 1304 is similar to that describe with reference to FIG. 12, but there are now four directions, and each photosensitive element contributes to either main (in-phase) or quadrature signals in each of the four directions. A first group of signal lines 1306 couple to all photosensitive elements to detect motion in a horizontal direction. A second group of signal lines 1308 is connected to detect vertical movement, a third group of signal lines 1310 is connected to detect movement in a direction −45° from vertical, and a fourth group of signal lines 1312 is connected to detect movement in a direction +45° from vertical. It is noted that the signal lines in the groups of signal lines 1310 and 1312 are spaced more closely together than in groups of signal lines 1306 and 1308. This is an indication that they are detecting a different, higher spatial frequency than the groups of signal lines 1306 and 1308. Once again, each of the lines in the groups of signal lines 1306, 1308, 1310 and 1312 appear in either a solid or dashed pattern. The solid lines are main or in-phase signal lines for the group, while the dashed lines are for quadrature signal lines. The signs + and − indicate the weighting coefficient of +1 and −1 respectively.

A heavy black line outlines a unit cell 1314 of the periodic pattern, and there are 16 photosensitive elements in the unit cell. So there are basically 16 distinct "flavors" of photosensitive element 1304, each element characterized by the weighting coefficient that applies for each of the axes and whether it goes to main or quadrature for that axis. Again, the heavy black dots indicate photosensitive elements of the same flavor or making the same contribution to each axis. After combining all photosensitive elements 1304 of a single flavor, the signal from each flavor is split four ways and routed, with the appropriate weighting coefficient, to main and quadrature signals for each of the four axes.

It should be noted that this concept can be generalized to any periodic array; by superimposing multiple periodic grids on the array. For example, one can extract multiple direction vectors, using all detectors in each calculation, without having to add individual weighting coefficients. One could also add more directions to this array based on other periodicities within the array; the number of flavors of cell climbs significantly, of course.

In summary, methods for measuring displacements in 2D using light-dark patterns on a 2D array, and various embodiments of that array have been described. In general, the method employs a two-dimensional array of pixels or photosensitive elements connected in a fashion that enables simplified, signal processing of a given spatial frequency that is of primary importance for the given displacement-measurement application. Various embodiments of the pixel-connection scheme can be implemented to allow processing of different (or multiple) spatial frequencies. This method allows 2D speckle-based displacement measurements with lower power required from signal processing electronics than in 2D correlation type devices, and without compromising measurement accuracy as in prior devices using linear, 1D comb-arrays.

The foregoing description of specific embodiments and examples of the invention have been presented for the purpose of illustration and description, and it is not to be construed as being limited thereby. They are not intended to be exhaustive or to limit the invention to the precise forms disclosed, and many modifications, improvements and variations within the scope of the invention are possible in light of the above teaching. It is intended that the scope of the invention encompass the generic area as herein disclosed, and by the claims appended hereto and their equivalents.

What is claimed is:

1. An optical sensor for sensing relative movement between the sensor and a surface by detecting changes in optical features of light reflected from the surface, the sensor comprising a two dimensional (2D) comb-array of photosensitive elements, the array including at least a first plurality of photosensitive elements arranged and coupled to sense a first combined movement along a first set of at least two non-parallel axes, and a second plurality of photosensitive elements arranged and coupled to sense a second combined movement along a second set of at least two non-parallel axes;

wherein the first and the second plurality of photosensitive elements are regularly spaced and have periodicity in at least a one dimension of the 2D comb-array; and wherein the sensor is a speckle-based sensor configured to sense movement based on changes in a complex interference pattern created by a light reflected from the surface from a coherent light source.

2. An optical sensor according to claim 1, wherein the first plurality of photosensitive elements are arranged periodically along the first set of at least two non-parallel axes, and the second plurality of photosensitive elements are arranged periodically along the second set of at least two non-parallel axes.

3. An optical sensor according to claim 1, wherein the first and the second plurality of photosensitive elements are regularly spaced and have periodicity in two dimensions of the array.

4. An optical sensor for sensing relative movement between the sensor and a surface by detecting changes in optical features of light reflected from the surface, the sensor comprising a two dimensional (2D) array of photosensitive elements, the array including at least a first plurality of photosensitive elements arranged and coupled to sense a first combined movement along a first set of at least two non-parallel axes, and a second plurality of photosensitive elements arranged and coupled to sense a second combined movement along a second set of at least two non-parallel axes; and wherein the array is a non-periodic array, and wherein the first and the second plurality of photosensitive elements are regularly spaced but not periodic.

5. An optical sensor for sensing relative movement between the sensor and a surface by detecting changes in optical features of light reflected from the surface, the sensor comprising a two dimensional (2D) array of photosensitive elements, the array including at least a first plurality of photosensitive elements arranged and coupled to sense a first combined movement alone a first set of at least two non-parallel axes, and a second plurality of photosensitive elements arranged and coupled to sense a second combined movement along a second set of at least two non-parallel axes; and wherein the array is a quasi-periodic array, and wherein the first and the second plurality of photosensitive elements are regularly spaced and quasi-periodic.

6. An optical sensor for sensing relative movement between the sensor and a surface by detecting changes in optical features of light reflected from the surface, the sensor comprising a two dimensional (2D) array of photosensitive elements, the array including at least a first plurality of photosensitive elements arranged and coupled to sense a first combined movement along a first set of at least two non-parallel axes, and a second plurality of photosensitive elements arranged and coupled to sense a second combined movement along a second set of at least two non-parallel axes; and wherein the first and second plurality of photosensitive elements include at least one shared photosensitive element arranged to sense movement along both the first and second sets of at least two non-parallel axes.

7. An optical navigation system for use in a data input device to sense displacement of the data input device relative to a surface by detecting changes in optical features of light reflected from the surface, the system comprising:

an illuminator to illuminate a portion of the surface;

imaging optics to map the illuminated portion of the surface to an optical sensor, wherein the sensor is a speckle-based sensor configured to sense movement bated on changes in a complex interference pattern created by a light reflected from the surface from a coherent light source; and wherein the sensor comprises a two dimensional (2D) comb-array of photosensitive elements, the array including at least a first plurality of photosensitive elements arranged and coupled to sense a first combined movement along a first set of at least two non-parallel axes, and a second plurality of photosensitive elements arranged and coupled to sense a second combined movement along a second set of at least two non-parallel axes; and wherein the first and the second plurality of photosensitive elements are regularly spaced and have periodicity in at least a one dimension of the 2D array.

8. An optical navigation system according to claim 7, wherein the first plurality of photosensitive elements are arranged periodically along the first set of at least two non-parallel axes and the second plurality of photosensitive elements are arranged periodically along the second set of at least two non-parallel axes.

9. An optical navigation system according to claim 7, further comprising a front-end circuit for combining outputs of the first plurality of photosensitive elements into a first in-phase signal and a first quadrature signal, and for combining outputs of the second plurality of photosensitive elements into a second in-phase signal and a second quadrature signal.

10. An optical navigation system according to claim 9, wherein the front-end circuit further comprises means for applying a weight to said outputs before summing said weighted outputs into said in-phase and quadrature signals.

11. An optical navigation system according to claim 7, wherein imaging optics comprise an aperture configured to provide telecentric imaging to preserve integrity of the speckle pattern during motion and to match an average size of the speckle to a period of the comb-array.

12. An optical navigation system according to claim 7, wherein the illuminator is configured to illuminate the portion of the surface at a predetermined incident angle to permit detection of fitting of the data input device from the surface.

13. A method of sensing two-dimensional (2D) displacement of an optical speckle-based sensor relative to a surface, the optical sensor comprising a two dimensional (2D) comb-array of photosensitive elements, the array including at least a first plurality of photosensitive elements and a second plurality of photosensitive elements, wherein the first and the second plurality of photosensitive elements are regularly spaced and have periodicity in at least a one dimension of the 2D array, the method comprising a step of:
  illuminating a portion of the surface;
  mapping the illuminated portion of the surface to the array;
  sensing with the first plurality of photosensitive elements a first combined movement along a first set of at least two non-parallel axes; and
  sensing with the second plurality of photosensitive elements a second combined movement along a second set of at least two non-parallel axes; and
  wherein the steps of sensing movement along the first and second sets of at least two non-parallel axes comprises the steps of sensing movement based on changes in a complex interference pattern created by a light reflected from the surface from a coherent light source.

14. A method according to claim 13, wherein the steps of sensing movement along the flit and second sets of at least two non-parallel axes further comprises the steps of combining outputs of the first plurality of photosensitive elements into a first in-phase signal and a first quadrature signal, and combining outputs of the second plurality of photosensitive elements into a second in-phase signal and a second quadrature signal.

15. A method according to claim 14, wherein the steps of sensing movement along the first and second sets of at least two non-parallel axes further comprises the steps of applying a weight to said outputs before summing said weighted outputs into said first and second in-phase and quadrature signals.

* * * * *